United States Patent

Uchiyama et al.

[11] Patent Number: 5,950,025
[45] Date of Patent: Sep. 7, 1999

[54] PRINT FORMAT SELECTION DEVICE FOR CAMERA

[75] Inventors: Keiji Uchiyama; Mitsuhiro Moriya, both of Minami-ashigara, Japan

[73] Assignee: Fuji Photo Film Co., Ltd., Kanagawa, Japan

[21] Appl. No.: 08/889,578

[22] Filed: Jul. 8, 1997

[30] Foreign Application Priority Data

Jul. 12, 1996 [JP] Japan .................................... 8-183775
Jul. 16, 1996 [JP] Japan .................................... 8-186189

[51] Int. Cl.⁶ ............................ G03B 17/24; G03B 13/10
[52] U.S. Cl. ......................... 396/315; 396/317; 396/378; 396/380; 396/435
[58] Field of Search .................................... 396/315, 316, 396/317, 318, 378, 380, 435

[56] References Cited

U.S. PATENT DOCUMENTS

| | | | |
|---|---|---|---|
| 2,187,246 | 1/1940 | Nerwin | 396/378 |
| 2,552,940 | 5/1951 | Cornut | 396/378 |
| 3,118,014 | 1/1964 | Winkler | 396/378 |
| 4,973,997 | 11/1990 | Harvey | 396/315 |
| 5,059,994 | 10/1991 | Harvey | 396/380 |
| 5,349,402 | 9/1994 | Soshi et al. | 396/318 |
| 5,476,232 | 12/1995 | Kataoka et al. | 242/348.4 |
| 5,619,737 | 4/1997 | Horning et al. | 396/195 |
| 5,784,658 | 7/1998 | Hata et al. | 396/311 |

FOREIGN PATENT DOCUMENTS

| | | |
|---|---|---|
| 976 388 | 8/1963 | Germany . |
| 6-266053 | 9/1994 | Japan . |
| 06301157 | 10/1994 | Japan . |
| 08160523 | 6/1996 | Japan . |

Primary Examiner—Eddie C. Lee
Attorney, Agent, or Firm—Young & Thompson

[57] ABSTRACT

A print format selection device for selecting one of different print formats to each picture frame of a filmstrip loaded in a camera or lens-fitted photo film unit, wherein an original field of view of a viewfinder corresponds to a picture frame defined by an exposure aperture of the camera. A rotatable view changing plate is provided to limit the original field of view in correspondence with the selected print format. The view changing plate is formed with two view windows of different aspect ratios from the original field of view. The centers of the view windows are on a circle which is coaxial with the rotational axis of the view changing plate and which extend across an optical axis of the viewfinder.

19 Claims, 23 Drawing Sheets

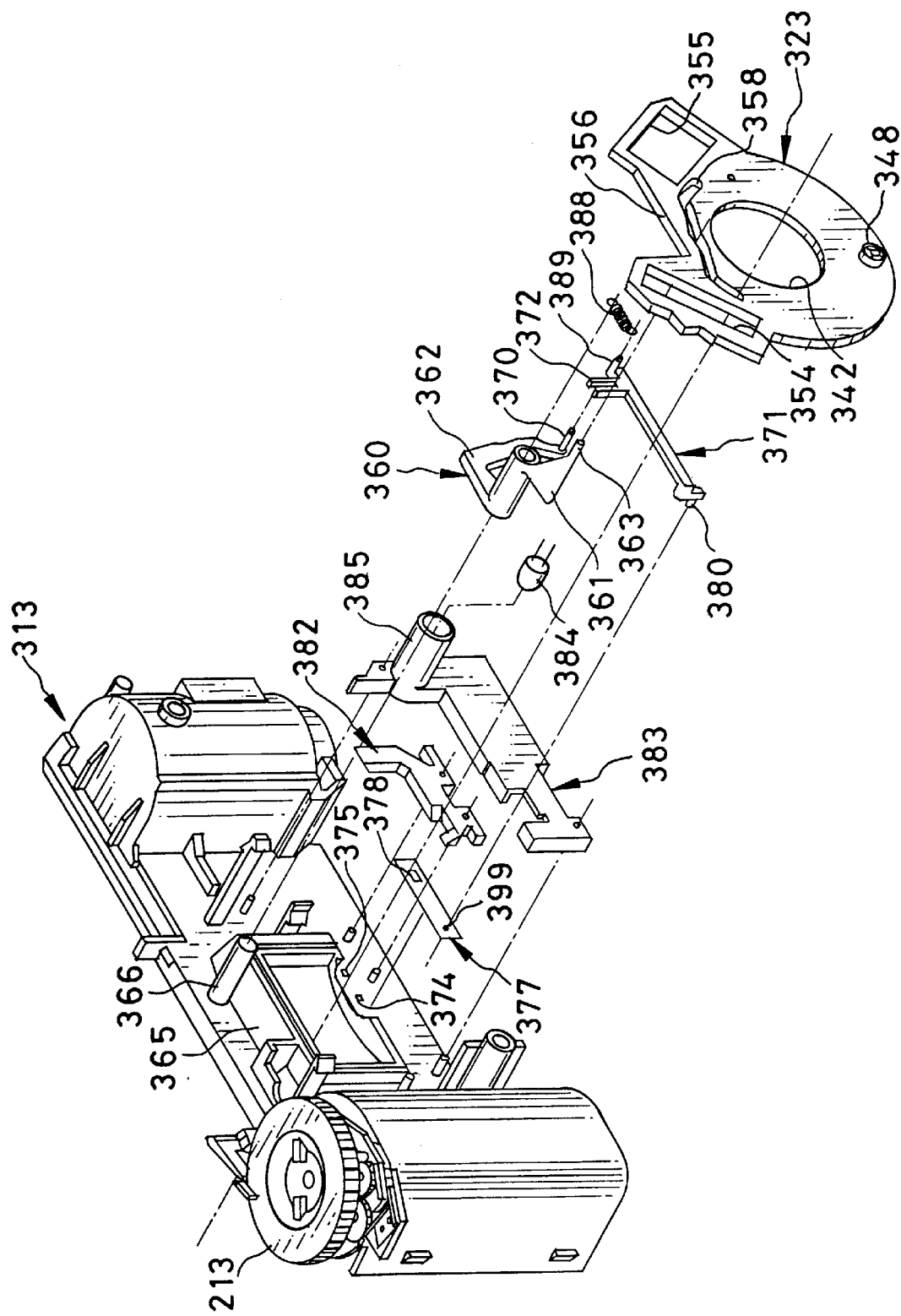

PRINT FORMAT SELECTION DEVICE FOR CAMERA

BACKGROUND OF THE INVENTION

1. Field of the Invention

The present invention relates to a print format selection device for cameras and lens-fitted photo film units, by which picture frames can be designated to be printed in different formats within a filmstrip, and by which the field of view of the viewfinder is changed in accordance with the designated print format.

2. Description of the Related Art

Compact reasonable cameras and lens-fitted photo film units, hereinafter referred to as film units, each preloaded with a photo film cartridge are getting more popular as a user-friendly snapshot camera. To add amusement in the snap-photography, a print system has been provided for making photo prints in different formats, including an ISO 135 standard size or 35 mm film size whose aspect ratio is about 1.5, an elongated panoramic size (P size) which is about double the ISO 135 size in length and thus has an aspect ratio of about 3.0, and a high-vision size (H size) whose aspect ratio is proximate to that of the high-vision TV screen, i.e. about 1.8. In general, the P size photo print is about 89 mm×127 mm, the H size photo print is about 89 mm×158 mm, and the ISO 135 size is about 89 mm×127 mm.

As one method for providing photo prints of different formats from a filmstrip, it is known to use a light shielding mask or blades to limit the exposure range on the filmstrip for each frame according to the designated print format, and make the photo prints from the exposure frames of correspondingly different aspect ratios. Regarding conventional ISO 135 or 35 mm film whose full size frame is 24 mm×36 mm, upper and lower portions of the full size frame exposure range are masked out for forming a P size exposure frame of 13 mm×36 mm, or a H size exposure frame of 20 mm×36 mm.

It is also known in the art to record every picture frame in the same size while recording data for designating a print format to each frame concurrently. According to this method, prints are made in the designated print formats from the same size picture frames by limiting the printing range of each frame corresponding to the aspect ratio of the designated print format. As the print format data recorded concurrently with each picture frame, it is known in the art to record a dot pattern on the photo film on one margin of the picture frame. JPA 8-160523 discloses a film unit utilizing ambient light for photographically recording the dot pattern on the photo film.

Recently, a new type photo film cartridge called IX 240 type or APS (Advanced Photo System) type has been brought to market. As disclosed for example in JPA 6-301157, the IX 240 photo film cartridge can contain a leader of a filmstrip therein and advance it to the outside by rotating its spool in an unwinding direction. The standard frame exposure range of the filmstrip contained in the IX 240 photo film cartridge is 16.7 mm×30.2 mm.

As the aspect ratio of the IX 240 standard frame is about 1.8, i.e. the H size, a H size photo print is made from the standard frame. In this case, a C size photo print that is equivalent to the ISO 135 standard photo print is made by limiting right and left portions of the standard frame exposure range or the printing range of the standard picture frame to 16.7 mm×23.4 mm. On the other hand, a P size photo print is made by limiting upper and lower portions of the standard frame exposure range or the printing range of the standard picture frame to 9.5 mm×30.2 mm.

Many of those cameras and film units which have the above described function to designate a different print format for each picture frame within a filmstrip concurrently with the exposure, also have a function to change the field of view in correspondence with the designated print format or printing range, so that the photographer can frame the photographic scene to be included in the individual photo print of the designated print format.

According to a method of changing over the field of view among three different sizes, a finder mask plate or view changing plate having two different windows is moved into an original field of view so as to limit the original view field by either of the two different windows. For example, in a 35 mm camera, the original view field shows a scene to be included in the ISO standard photo print, whereas the two different windows correspond to the P size print format and the H size print format respectively. The finder mask plate should be retracted from the field of view while the standard photo print is designated. Accordingly, it is necessary to provide the camera or the film unit with a relief space or room for allowing the finder mask plate to retract from the field of view.

Since the viewfinder is mostly disposed above the taking lens, the relief space can only be provided on horizontal sides of the viewfinder. Therefore, it is conventional to dispose two different windows side by side in an horizontally elongated finder mask plate, as shown for example in FIG. 28. The example of FIG. 28 relates to a camera for the IX 240 type photo film cartridge, so the original finder window 89 is the H size, and the finder mask plate 90 has the P size and the C size windows 92 and 93. In this case, a relief space 95 for retracting the P size window 92 from the H size finder window 89 while inserting the C size window 93 in the original field of view is necessary on one horizontal side of the finder window 89, and also a relief space 96 for retracting the finder mask plate 90 from the finder window 89 is necessary on the other horizontal side.

Where the H size finder window 89 has a length "A" in the horizontal direction, the space 95 and 96 should have at least the length "A" and a length "2×A" respectively in the horizontal direction. As a total, it is necessary for the finder mask plate 90 to provide at least a fourfold sliding space of the H size finder window. Consequently, the horizontally elongated conventional finder mask plate is disadvantageous for the film unit and the compact camera insofar as it limits compactness.

SUMMARY OF THE INVENTION

In view of the foregoing, a prime object of the present invention is to provide a print format selection device for a camera, which can be compactly incorporated into the camera.

Another object of the present invention is to provide a print format selection device for a camera, which is easy to handle and stable in operation.

To achieve the above objects, a print format selection device for a camera according to the present invention is comprised of a manual operation member slidable at least between a first print format position for designating a picture frame to be printed in a first size corresponding to an exposure aperture of the camera, a second print format position for designating a picture frame to be printed in a second size different from the first size, and a third print format position for designating a picture frame to be printed in a third size different from the first and second sizes; and a view changing plate rotatable about an axis in cooperation with the manual operation member and having at least two different view windows whose centers are disposed on a circle which is coaxial with the rotational axis of the view changing plate and which extends across an optical axis of the viewfinder.

One or the other of the two view windows is placed in an original field of view of a viewfinder of the camera when the manual operation member is set to the second or third print format position, limiting the original field of view to correspond to the second or third size, respectively.

According to a preferred embodiment of the invention, the rotational axis of the view changing plate is disposed on an optical axis of a photographic lens, and the view changing plate has a round hole coaxial with the rotational center thereof. The round hole is fitted on a cylindrical lens barrel of the photographic lens, so that the view changing plate rotates about the optical axis of the photographic lens.

According to another preferred embodiment of the invention, the rotational axis of the view changing plate is disposed below a photographic lens, and the view changing plate has an arcuate cutout along a circle which is coaxial with the rotational axis and extends across an optical path of the photographic lens, so that the view changing plate rotates without interfering in the optical path of the photographic lens.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 27 is an exploded perspective view of the print format selection device of the fifth embodiment.

DETAILED DESCRIPTION OF THE PREFERRED EMBODIMENT

Figure 1:
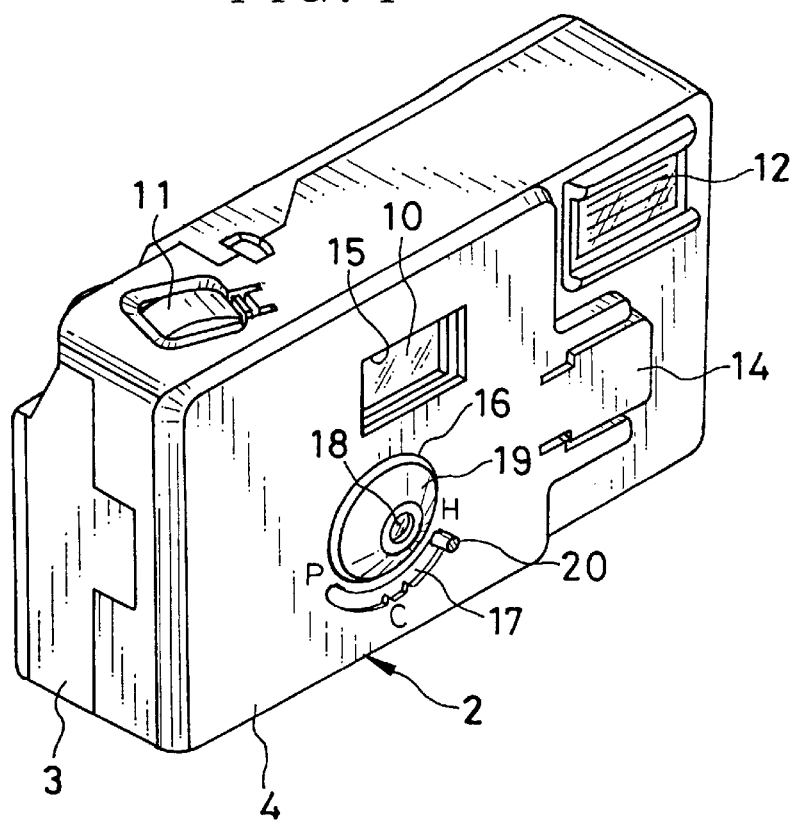
FIG. 1 is a perspective view of a film unit with a print format selection device according to a first embodiment of the invention.

In FIG. 1, a film unit 2 is constituted of a unit main body 3 containing a photo film cassette and having a simple photographic mechanism, and a front plate 4 attached to the front of the unit main body 3. The unit main body 3 is provided with a finder objective lens 10, a shutter button 11, and a flash window 12. The front plate 4 has a flash charge button 14 formed integrally therewith, and has a rectangular opening 15, a round opening 16 and a guide slot 17. The opening 15 is an objective window for exposing the finder objective lens 10 to the outside. The opening 16 is for exposing a round lens hood 19 holding a taking lens 18 to the outside. The guide slot 17 arcs around the opening 16 and guides a print format knob 20 to one of three positions H, C and P along the slot 17, of which one terminal position P is to select the panoramic size as the print format, the other terminal position H is to select the high-vision size, and the middle position C is to select the cinematic size.

On the front side of the unit main body 3 are formed the lens hood 19, stopper projections 22 and 23, a pivot pin 24, a high-vision view window 27 and other elements. The high-vision view window 27 is aligned with the opening 15, and the objective lens 10 is mounted behind the high-vision view window 27. The high-vision view window 27 and the opening 15 are substantially equal in size, and have an aspect ratio approximately equal to that of the high-vision size (H size) print, so that the photographer can frame a photographic field of H size when the knob 20 is set in the position H. The unit main body 3 has a not-shown exposure aperture that has approximately the same aspect ratio as the H size print, so that every image frame is recorded in H size on photo film.

A contact plate 28 of a flash charge switch, a view changing plate 29 and a toggle spring 40 are mounted to the front side of the unit main body 3. The view changing plate 29 has the knob 20, a round hole 31, a panoramic view window 33 and a cinematic view window 34 formed integrally therewith. The panoramic view window 33 has an aspect ratio approximately equal to that of the panoramic size (P size) print, and the cinematic view window 34 has an aspect ratio approximately equal to that of the cinematic size (C size) print.

The round hole 31 of the view changing plate 29 is fitted on the lens hood 19 such that the view changing plate 29 is rotatable about an optical axis 18a of the taking lens 18. The panoramic view window 33 and the cinematic view window 34 are disposed around the round hole 31. Centers 33a and 34a of the view windows 33 and 34 are on a circle which is coaxial with the optical axis 18a and which extends across an optical axis 10a of the viewfinder 10. Of course, the high-vision view window 27 is concentric with the optical axis 10a of the viewfinder 10. When the knob 20 is slid to the position P, the view changing plate 29 rotates to insert the panoramic view window 33 right in front of the high-vision view window 27. When the knob 20 is slid to the position C, the cinematic view window 34 is inserted right in front of the high-vision view window 27.

Figure 5:
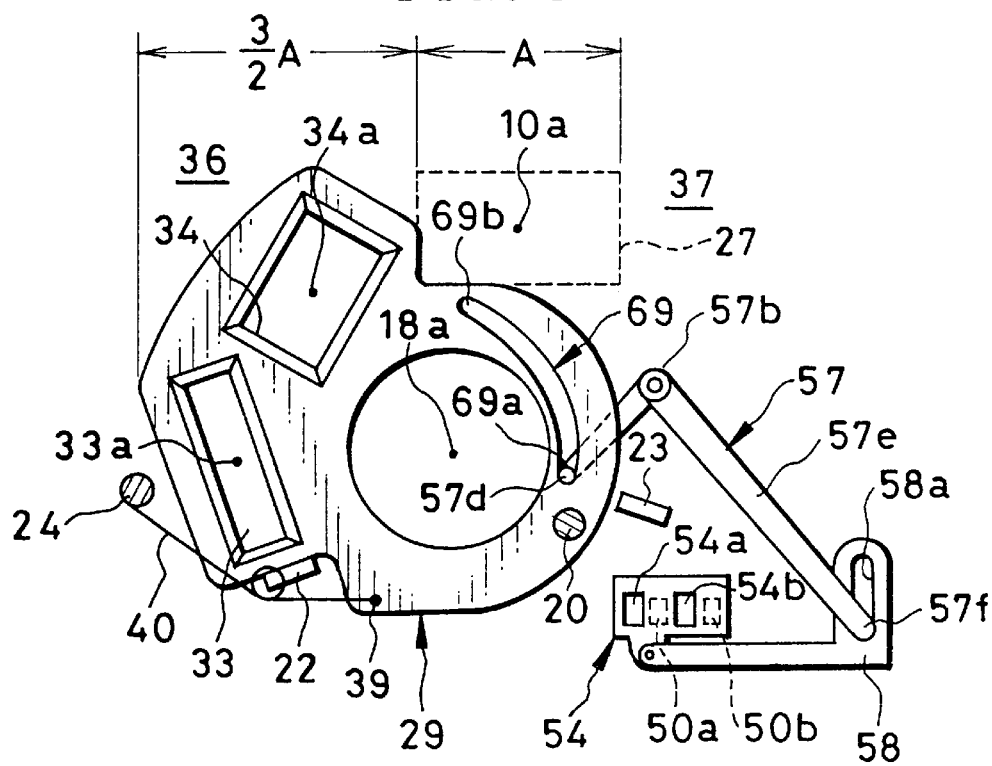
FIG. 5 is an explanatory front view of the print format selection device of the first embodiment in a high-vision position.
Figure 3:
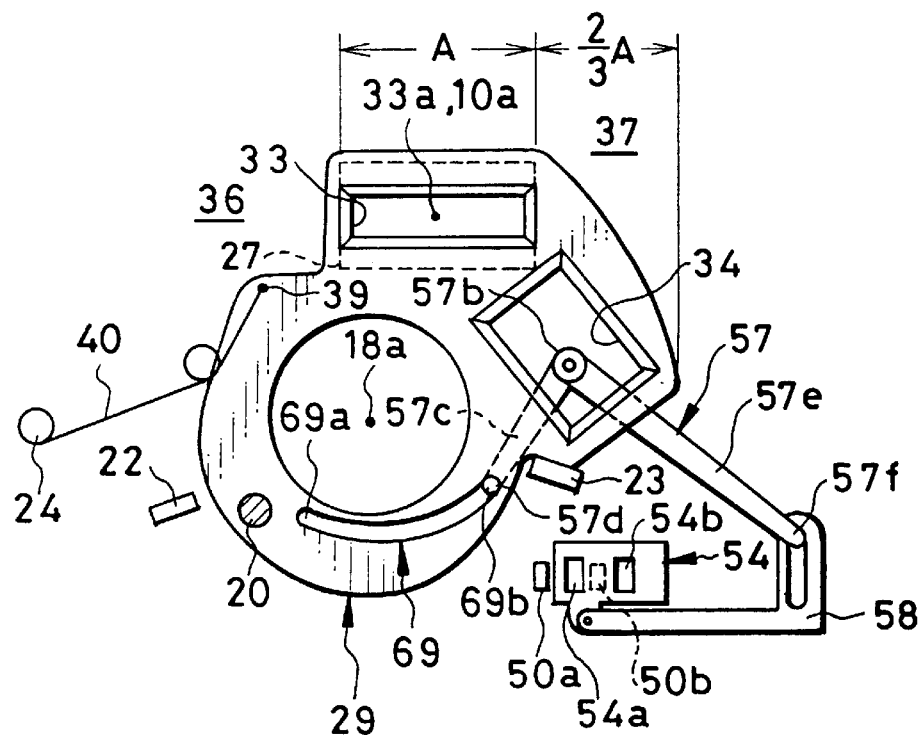
FIG. 3 is an explanatory front view of the print format selection device of the first embodiment in a panoramic position.
Figure 4:
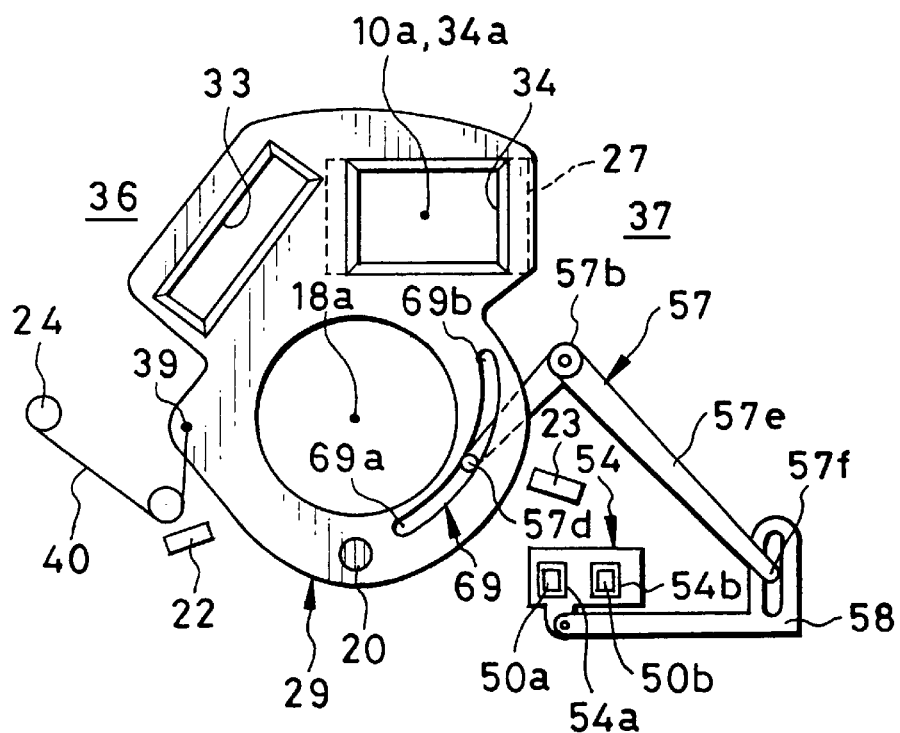
FIG. 4 is an explanatory front view of the print format selection device of the first embodiment in a cinematic position.

Relief recesses 36 and 37 for allowing the view changing plate 29 to rotate in either direction are provided around the lens hood 19 on a front surface 3a of the unit main body 3. When the knob 20 is placed in the position P, the cinematic view window 34 is retired to the relief recess 37, as is shown in FIG. 3. When the knob 20 is placed in the position C, the panoramic view window 33 is retired to the relief recess 36, as is shown in FIG. 4. When the knob 20 is placed in the position H, the panoramic and cinematic view windows 33 and 34 are retired to the relief recess 36, as is shown in FIG. 5. The stopper projections 22 and 23 are formed on opposite horizontal sides of the lens hood 19, to limit the rotation of the view changing plate 29 to the range from the position H to the position P.

Figure 28:
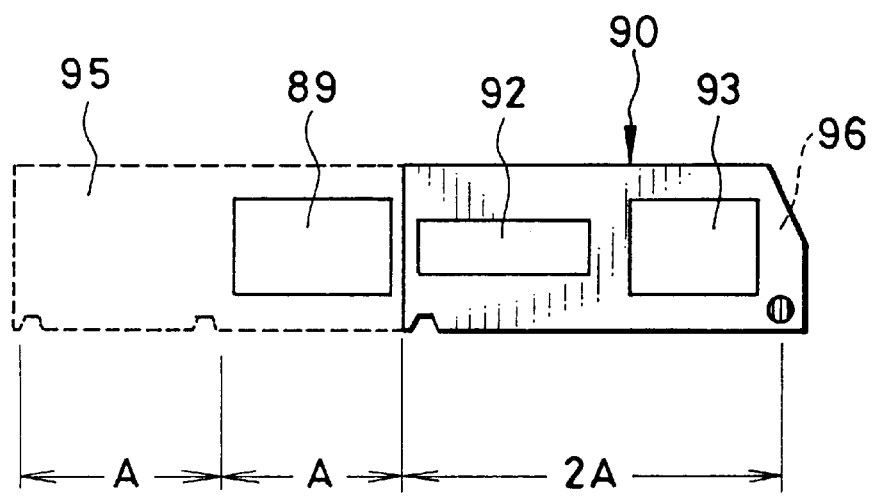
FIG. 28 is an explanatory front view illustrating a conventional view changing plate.

As shown in FIG. 3, the relief recess 37 needs a length of about two-thirds a length A of the high-vision view window 27 in the horizontal direction. On the other hand, as shown in FIG. 5, the relief recess 36 needs a length of about one and one-half length A in the horizontal direction. Accordingly, the total length of these relief recesses 36 and 37 is merely about 19A/6, this is remarkably smaller than that necessary for a conventional horizontal sliding view field changing plate such as shown in FIG. 28.

Figure 2:
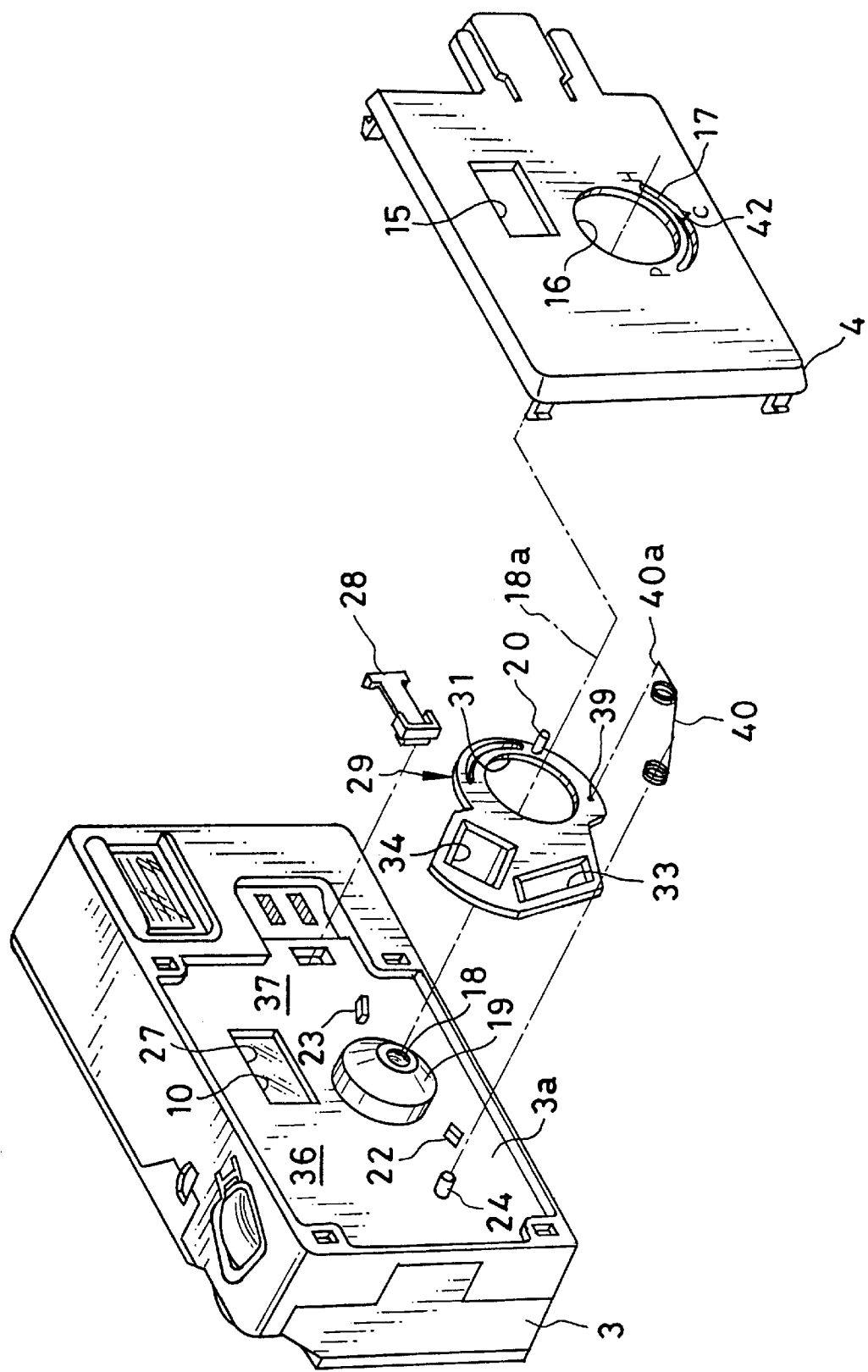
FIG. 2 is an exploded perspective view illustrating a view changing plate of the print format selection device of the first embodiment.

One end 40a of the toggle spring 40 is inserted from the front side into a small hole 39 of the view changing plate 29, and the other end is held on the pin 24 on the unit main body 3. The toggle spring 40 urges the view changing plate 29 to rotate toward the stopper projection 23 after the knob 20 is moved past the position C toward the position P, and urges the view changing plate 29 to rotate toward the stopper projection 22 after the knob 20 is moved past the position C toward the position H. As shown in FIG. 2, a click latch device 42 is formed in the guide slot 17 to latch the knob 20 at the position C.

Figure 6:
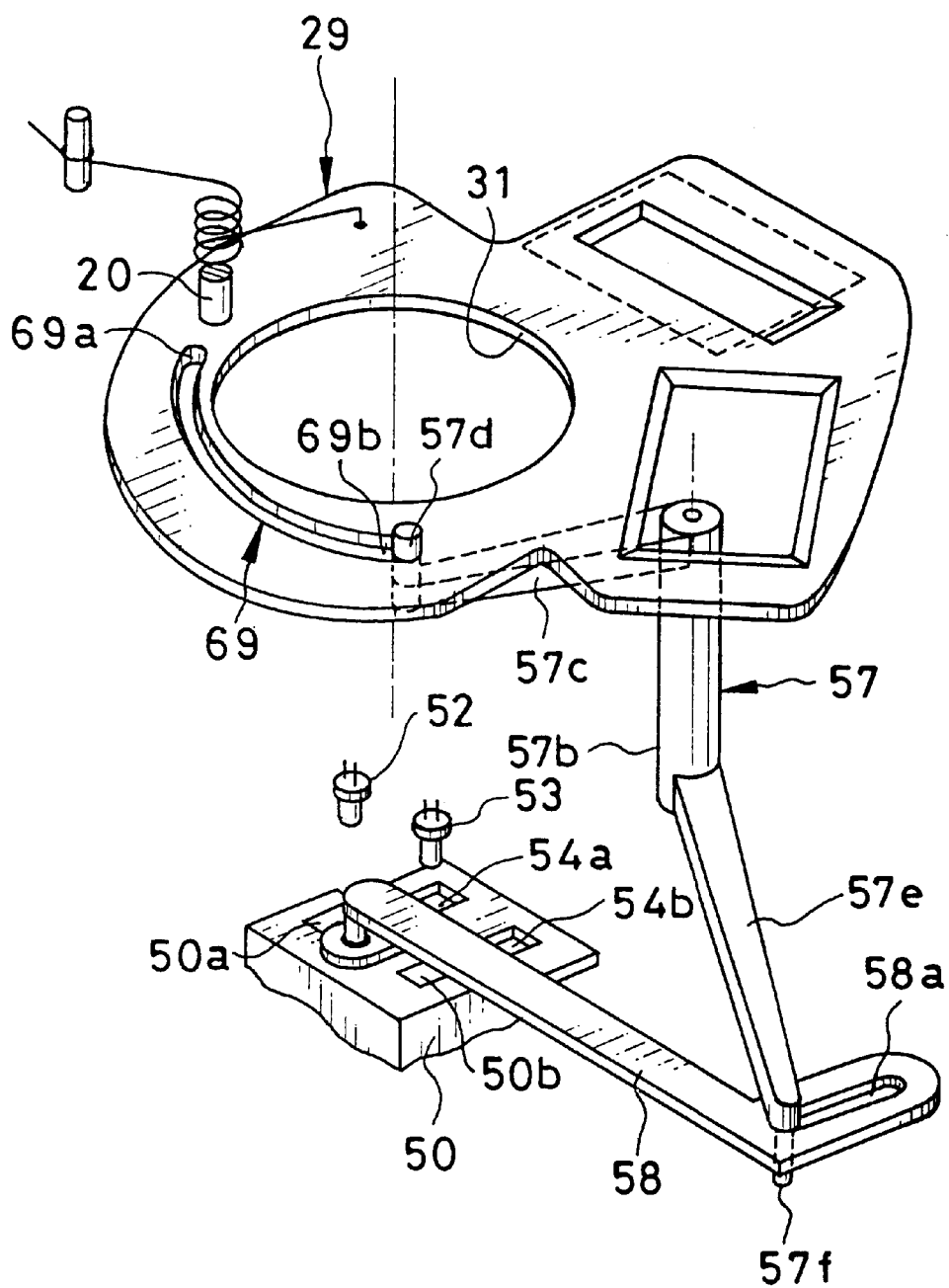
FIG. 6 is a perspective view of the print format selection device of the first embodiment.

FIG. 6 shows a print format data recording device which cooperates with the view changing plate 29 to record print format data photographically on the photo film. The print format data recording device is constituted of a mask plate 50, LEDs 52 and 53, a data switching blade 54, and first and second switching levers 57 and 58.

The mask plate 50 has two rectangular openings 50a and 50b which are disposed in front of a lower margin of a frame placed in an exposure position of the film unit. The LEDs 52 and 53 are arranged to face the rectangular openings 50a and 50b. The data switching blade 54 has two rectangular openings 54a and 54b. The first switching lever 57 is pivotal about a sleeve shaft 57b which extends in parallel to the optical axis 18a of the taking lens, and the second switching lever 58 is slidable in a horizontal direction of the film unit.

The first switching lever 57 has an arm 57c on one end of the sleeve shaft 57b. The arm 57c extends in a radial direction of the sleeve shaft 57b, and has a pin 57d at its distal end. The pin 57d extends in the direction of the optical axis 18a and protrudes into an arced guide slot 69 of the view changing plate 29. When the view changing plate 29 rotates, the pin 57d slides along the guide slot 69, thereby rotating the first switching lever 57. A second arm 57e is formed on the other end of the sleeve shaft 57d, and a pin 57f formed on the distal end of the second arm 57e is engaged in a slot 58a of the second switching lever 58. As the opposite end of the second switching lever 58 from the slot 58a is coupled to the data switching blade 54, the data switching blade 54 slides with the second switching lever 58 along with the rotation of the first switching lever 57 when the view changing plate 29 is rotated by the knob 20.

The film unit having the above configuration operates as follows:

To select the P size print, the knob 20 is set to the position P, wherein the panoramic view window 33 is in front of the high-vision view window 27 and the cinematic view window 34 is retired to the relief recess 37, as shown in FIG. 3, so that the view field is defined by the panoramic view window 33. Also, the toggle spring 40 urges the view changing plate 29 to contact the stopper projection 23, to prevent the view changing plate 29 from unexpected rotation.

Figure 7A:
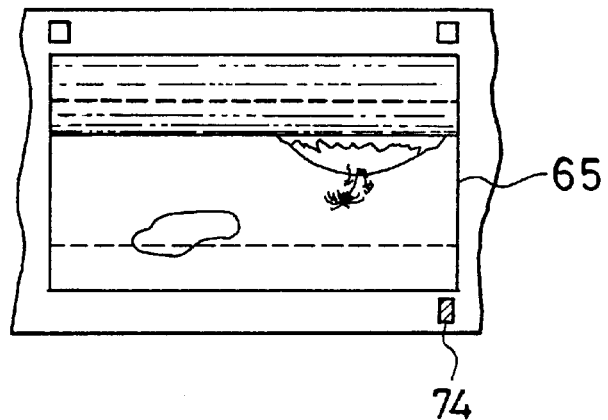
FIGS. 7A, 7B and 7C are explanatory views illustrating dot patterns as an example of print format data.

Along with the clockwise rotation of the view changing plate 29 toward the position P, the pin 57d comes into contact with one end 69b of the guide slot 69, so that the first switching lever 57 rotates counterclockwise. When the view changing plate 29 is placed with the knob 20 in the position P, the data switching blade 54 moves in a position closing merely one rectangular opening 50b. The LEDs 52 and 53 emit light synchronously with an exposure to the photo film. Specifically, the LEDs 52 and 53 are connected to a not-shown flash circuit of the film unit 2 such that the LEDs 52 and 53 are activated by a trigger signal that is generated when a not-shown synchronizing switch is turned on responsive to the shutter button 11 being depressed. Therefore, when the knob 20 is set in the position P, the light from the LED 52 travels through the opening 50a to record one rectangular dot 74 on the margin of the photographed picture frame 65, as shown in FIG. 7A. Thus, the one rectangular dot 74 severs as P size print format data.

When to select the C size print, the knob 20 is set to the position C, wherein the knob 20 is latched by the click device 41, to prevent the view changing plate 29 from unexpected rotation. In this position, the panoramic view window 33 is retired from the high-vision view window 27 to the relief recess 36 and the cinematic view window 34 moves in front of the high-vision view window 27, as shown in FIG. 4. Thereby, the view field is defined by the cinematic view window 34.

Figure 7B:
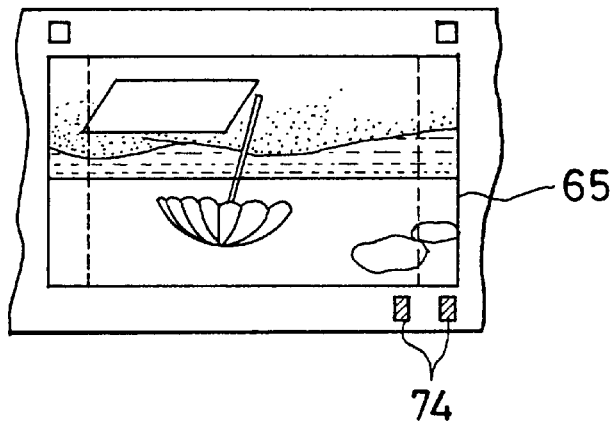

Along with the counterclockwise rotation of the view changing plate 29, the pin 57d of the first switching lever 57 moves to an intermediate portion of the guide slot 69, and the first switching lever 57 rotates counterclockwise. When the view changing plate 29 stopped with the knob 20 in the position C, the data switching blade 54 moves in a position where the openings 54a and 54b are right in front of the rectangular openings 50a and 50b. Accordingly, when the LEDs 52 and 53 emit light synchronously with an exposure to the photo film, the light beams from the LEDs 52 and 53 travel through the openings 50a and 50b to form two rectangular dots 74 on the margin of the photographed picture frame 65, as shown in FIG. 7B. Thus, the two rectangular dots 74 serve as C size print format data.

To select the H size print, the knob 20 is set to the position H, wherein the view changing plate 29 is retired from the high-vision view window 27 to the relief recess 37, as shown in FIG. 5, so that the view field is defined by the high-vision view window 27. Also, the toggle spring 40 urges the view changing plate 29 to contact the stopper projection 22, to prevent the view changing plate 29 from unexpected rotation.

Figure 7C:
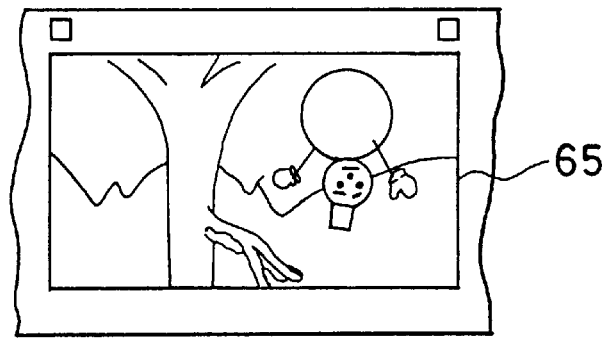

Along with the counterclockwise rotation of the view changing plate 29 toward the position H, the pin 57d comes into contact with one end 69a of the guide slot 69, and the first switching lever 57 rotates clockwise. When the view changing plate 29 is placed with the knob 20 in the position H, the data switching blade 54 moves in a position closing the rectangular openings 50a and 50b. Therefore, when the knob 20 is set in the position H, even though the LEDs 52 and 53 emit light synchronously with an exposure to the photo film, since the openings 50a and 50b are closed, no dot is recorded on the margin of the photographed picture frame 65, as shown in FIG. 7C.

When printing the photo film exposed in this way, the photo film is developed and set in an automatic photo-printer having a scanner which scans the photo film to detect the presence and the number of dots 74 recorded in the margin of each picture frame. If the picture frame 65 does not have any dot 74 in its margin, an H size mask corresponding to the H size picture frame 65 is automatically set to make an H size print from the substantially entire area of the picture frame 65. If the picture frame 65 has two dots 74 in its margin, a C size mask is used to mask right and left portions of the picture frame 65, as is implied by dashed lines in FIG. 7B, to make a C size print from the remaining area of the picture frame 65. If the P size print format data consisting of only one dot 74 is detected, a P size mask is used to mask upper and lower portions of the picture frame 65 as is implied by dashed lines in FIG. 7A, to make a P size print from the remaining area of the picture frame 65.

Figure 8:
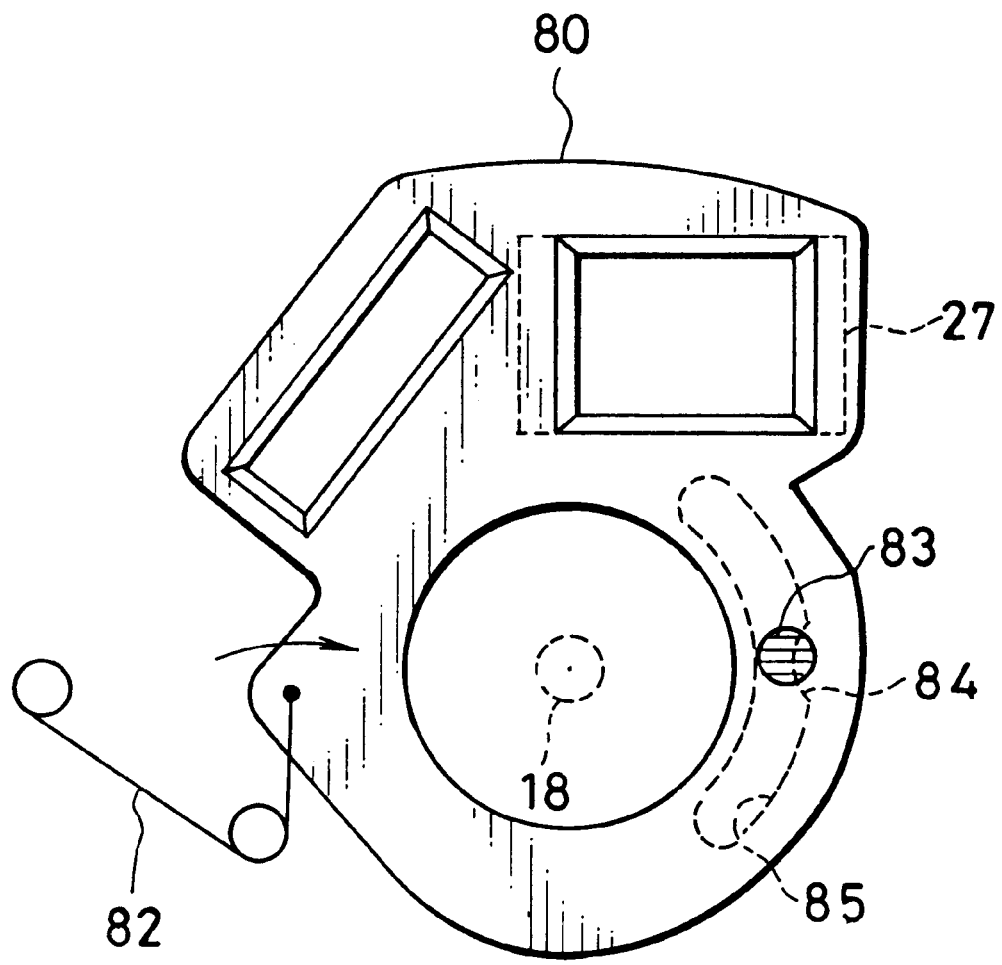
FIG. 8 is an explanatory front view of a view changing plate according to a second embodiment of the invention.

FIG. 8 shows another embodiment of view field changing plate 80. As shown in FIG. 8, a toggle spring 82, a knob 83 of the view field changing plate 80 and a click device 84 for latching the knob 83 in an intermediate position of a guide slot 85, e.g. a position for selecting the C size print, may be arranged such that the click device 84 is disposed across a rotational center from the toggle spring 82, and the knob 82 is urged by the toggle spring 82 into engagement with the click device 84.

Figure 9:
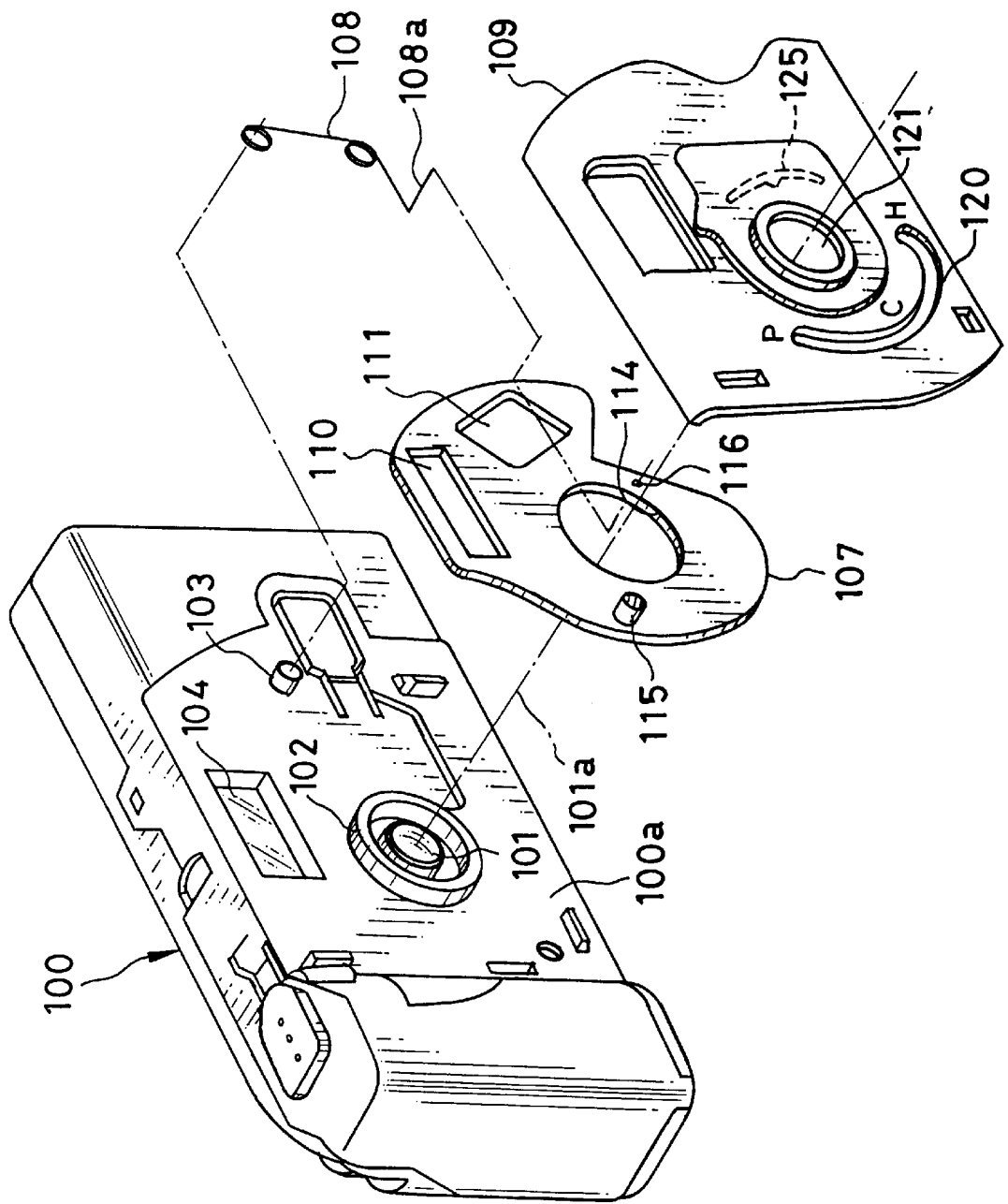
FIG. 9 is an exploded perspective view illustrating of a film unit with a print format selection device according to a third embodiment of the invention.

FIG. 9 shows a film unit according to another embodiment of the present invention. On a front side of a unit main body 100 around a taking lens 101, a cylindrical rim 102 for mounting a view changing plate 107 is formed. A pin 103 for mounting a toggle spring 108 and a high-vision view window 104 are also formed on a front surface 100a of the unit main body 100. A front plate 109 is attached to the front surface 100a through snap-in engagement, to cover the toggle spring 108 and the view changing plate 107 mounted to the front surface 100a.

The view changing plate is formed with a panoramic view window 110, a cinematic view window 111, a round hole 114, a knob 115, and a small hole 116 for the toggle spring 108. The round hole 114 is fitted on the cylindrical rim 102. As the rim 102 is coaxial with an optical axis 101a of the taking lens 101, the view changing plate is rotatable about the optical axis 101a. The centers of the windows 104, 110 and 111 are disposed on a circle which is coaxial with the optical axis 101a. The front plate 109 has a guide slot 120 and a round hole 121 for exposing the knob 115 and the taking lens 101 to the outside respectively. The knob 115 is slid along the guide slot 120, to be set in one of three predetermined positions P, C and H for selecting the P size print format, the C size print format and the H size print format respectively.

When the knob 115 is slid to the position P, the view changing plate 107 rotates to insert the panoramic view window 110 right in front of the high-vision view window 104. When the knob 115 is slid to the position C, the cinematic view window 111 is inserted right in front of the high-vision view window 104.

One end 108a of the toggle spring 108 is inserted from the backside into the hole 116. The other end is held on the pin 103. The toggle spring 108 alternatively urges the view changing plate toward either of two terminal positions that correspond to the positions P and H of the knob 115. That is, after the knob 115 moves past the position C in the clockwise direction, the view changing plate rotates clockwise under the force of the toggle spring 108 till the knob 115 comes to the position P. On the contrary, after the knob 115 moves past the position in the counter clockwise direction, the view changing plate rotates counterclockwise under the force of the toggle spring 108 till the knob 115 comes to the position H.

Figure 10:
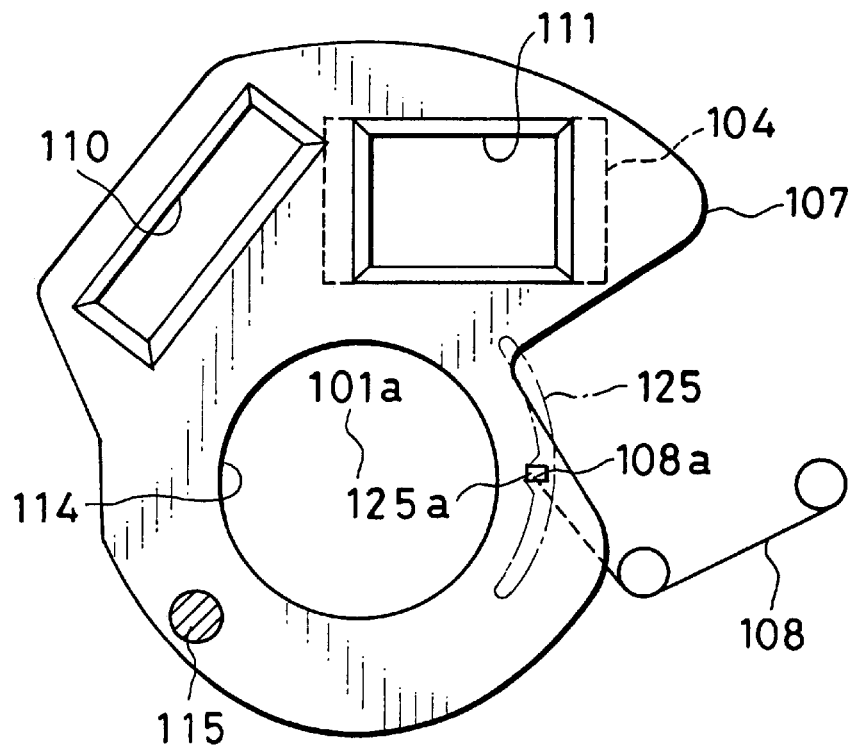
FIG. 10 is an explanatory front view of a view changing plate according to the third embodiment of the invention.

The end 108a of the toggle spring 108 protrudes forward from the view changing plate, and the front plate 109 has an arced groove 125 on its inside surface along the course of the end 108a of the toggle spring 108 so as to allow the same to move along the groove 125 while the view changing plate is rotated. As shown in detail in FIG. 10, the groove 125 is has a notch 125a recessing toward the optical axis 101a, such that when the knob 115 moves in the position C the end 108a of the toggle spring 108 is trapped in the notch 125a under its spring force. In this way, the view changing plate can stably position the cinematic view window 111 in front of the high-vision view window 104.

Figure 11:
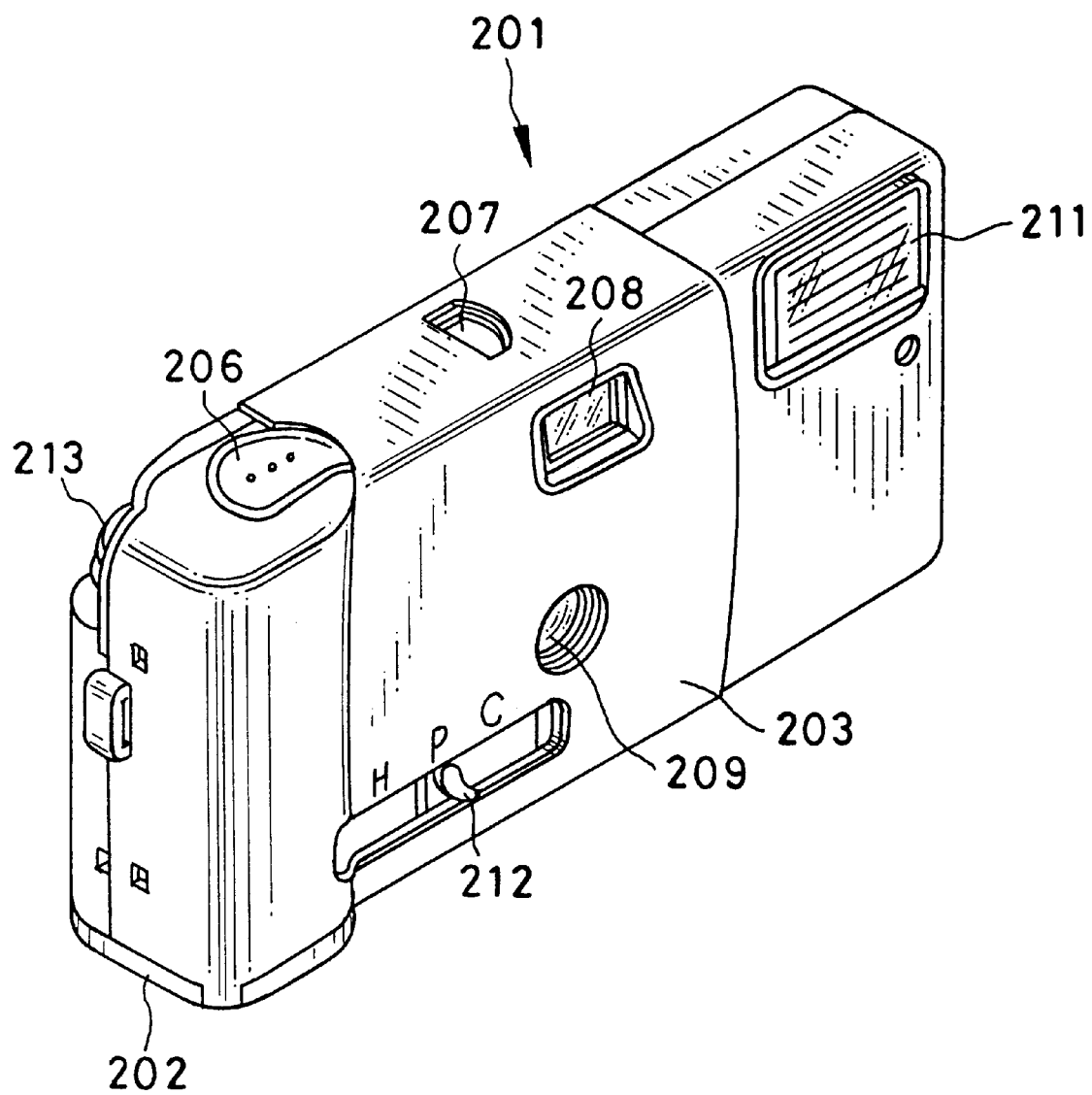
FIG. 11 is a perspective view of a film unit with a print format selection device according to a fourth embodiment of the invention.

FIG. 11 shows a film unit 201 according to a fourth embodiment of the invention. The film unit 201 is constituted of a unit main body 202 containing a photo film cassette and having a simple photographic mechanism, and a wrapping 203 which is wrapped around a middle portion the unit main body 202. The unit main body 202 is provided with a shutter button 206, a frame counter window 207, a viewfinder 208, a taking lens 209, and a flash window 211. In addition, a knob 212 is provided in a lower front portion of the unit main body 201 so as to be slidable in a horizontal direction. Designated by 213 is a film winding wheel 213. The wrapping 203 is adhered to the unit main body 202, and has cutouts for exposing the taking lens 209, the viewfinder 208, the frame counter window 207, the knob 212 and so forth.

Figure 12:
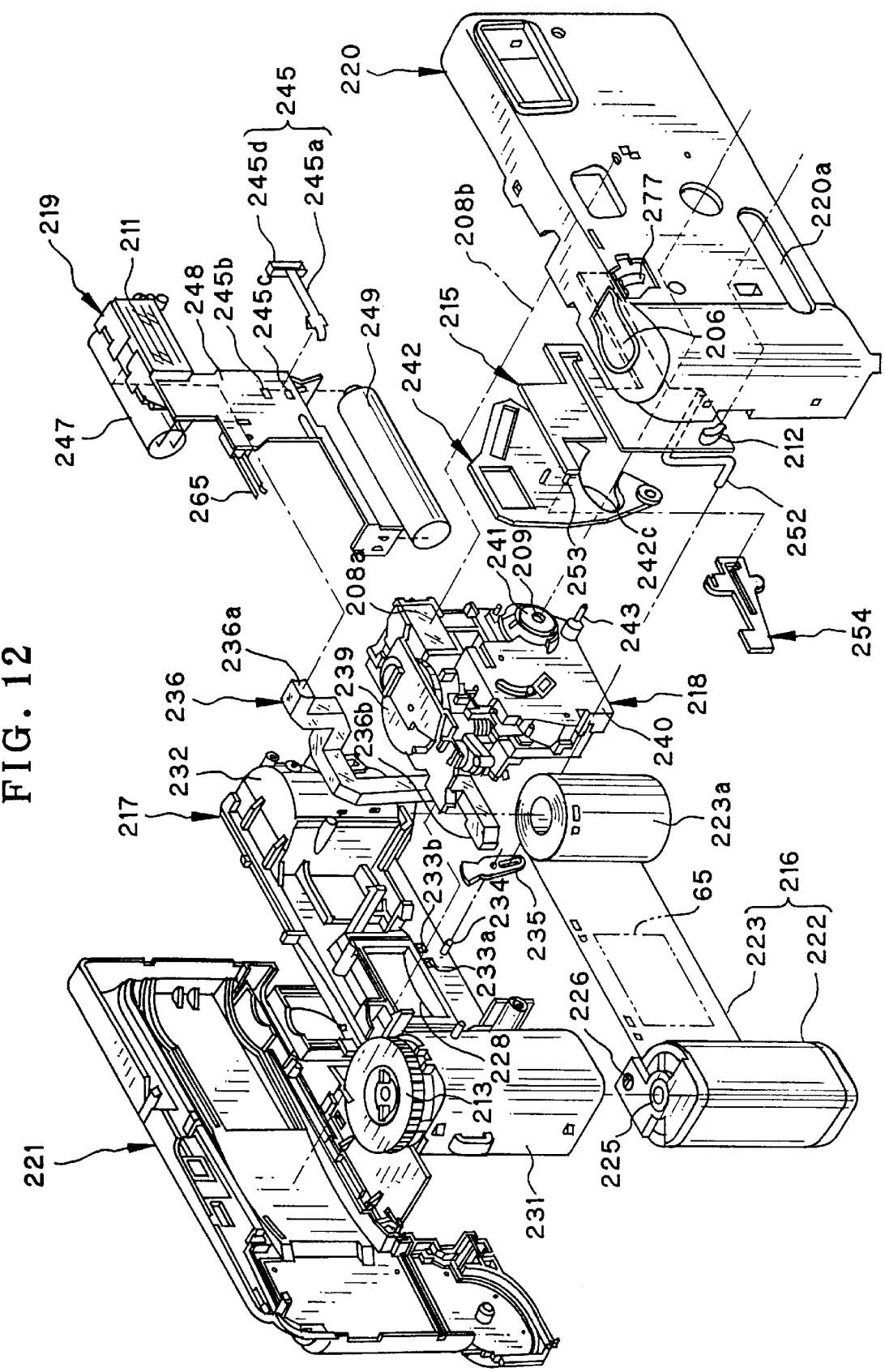
FIG. 12 is an exploded perspective view of the film unit shown in FIG. 11.

As shown in FIG. 12, the knob 212 is integrally formed on a lower front portion of a barrier plate 215, and is operated to move the barrier plate 215 to open or close the taking lens 209 and the viewfinder 208. A slot 220a for exposing the knob 212 is formed through the front cover 220. To a lower rear portion of the barrier plate 215 is secured an interconnection rod 252 whose free end is engaged with a data switching blade 235, to interconnect the barrier plate 215 with the data switching blade 235. The knob 212 is also operated to select a print format to each picture frame among of the high-vision size (H size), the panoramic size (P size) and the cinematic size (C size). By placing the knob 212 at the position H, the position P or the position C, the H size, the P size or the C size is selected as the print format, and the field of view of the viewfinder 208 is adjusted to the selected print format, as will be described in detail later.

The unit main body 202 is constituted of a basic portion 217 containing a photo film cartridge 216, an exposure assembly 218 and a flash assembly 219 which are attached to the front of the basic portion 217, a front cover 220 covering the front of the basic portion 217, and a rear cover 221 covering the rear of the basic portion 217. These components are assembled into the unit main body 202 by snap-in engagement.

The photo film cartridge 216 consists of a plastic cartridge shell 222 and a filmstrip 223. One end of the filmstrip 223 is secured to a rotary spool 225 mounted in the cartridge shell 222. The cartridge shell 222 has a film leader advancing mechanism that is disclosed for example in JPA 6-266053.

The basic portion 217 is an integral part having an exposure aperture 228 in a middle portion thereof, and a cartridge chamber 231 and a film roll chamber 232 on opposite sides of the exposure aperture 228. The exposure aperture 228 is sized to photograph every picture frame in a high-vision size. The cartridge chamber 231 holds the cartridge shell 222, and the film roll chamber 232 holds the filmstrip 223 in form of a roll 223a.

Figure 13:
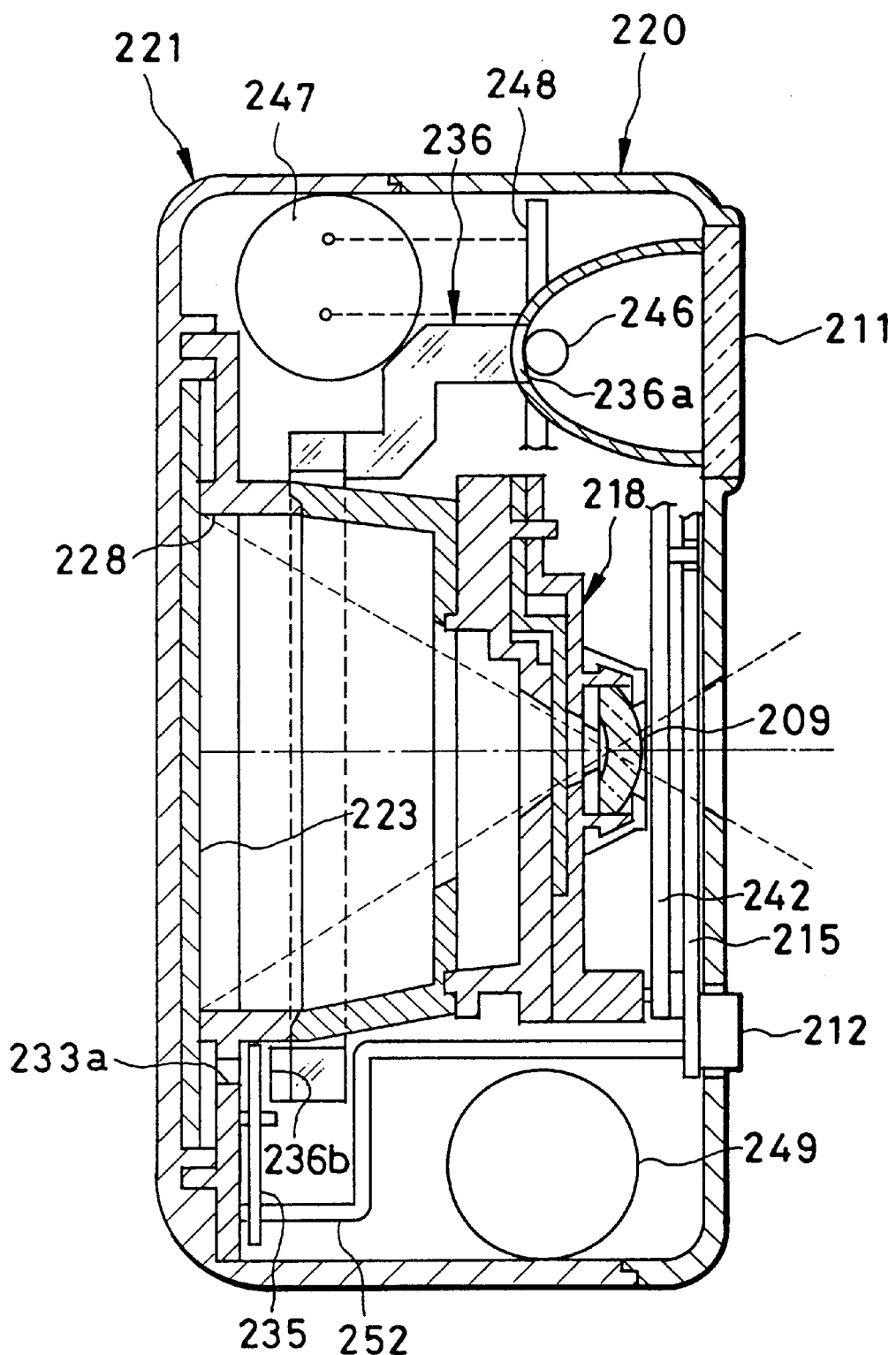
FIG. 13 is a sectional view of the film unit shown in FIG. 11.

The filmstrip 223 is advanced from the film roll chamber 232 into the cartridge shell 222 through a film passageway formed behind the exposure aperture 228. A pair of data openings 233a and 233b are formed under the exposure aperture 228 which are used to photographically record at most two rectangular dots as print format data on the filmstrip 223. One end 236b of a transparent plastic light guide 236 is arranged to face the data openings 233a and 233b. As shown in FIG. 13, the other end 236a of the light guide 236 faces a flash discharge tube 246 behind the flash window 211, so that the light radiated from the rear side of the flash discharge tube 246 is conducted through the light guide 236 by virtue of internal reflection thereof, and is projected toward the data openings 233a and 233b. The data switching blade 235 is mounted to be pivotal about a pin 234 which is formed below the data openings 233a and 233b on the front side of the basic portion 217. The data switching blade 235 is rotated by the interconnection rod 252 into and out of a gap between the light guide 236 and the data openings 233a and 233b.

The exposure assembly 218 includes a frame number counter disc 239, a film advancing mechanism, and a shutter mechanism. Also the taking lens 209 is held in a lens holder 241 that is formed in a front side of a base portion 240 of the exposure assembly 218. A pivot 243 for holding a view changing plate 242 in a rotatable fashion is formed under the lens holder 241. Above the lens holder 241, the viewfinder 208 is incorporated into the exposure assembly 218.

The flash assembly 219 has a charge switch 245 consisting of a contact plate 245a, a pair of contact chips 245b and 245c printed on a printed circuit board 248. The contact plate 245a is mounted to the basic portion 217 through a contact base 245d. The flash assembly 219 also has a main capacitor 247, and a battery 249 for charging the main capacitor 247. The flash assembly 219 is designed to be kept ready for flashing synchronously with exposure once the charge switch 245 is turned on even the charge switch 245 is turned off thereafter.

Figure 14:
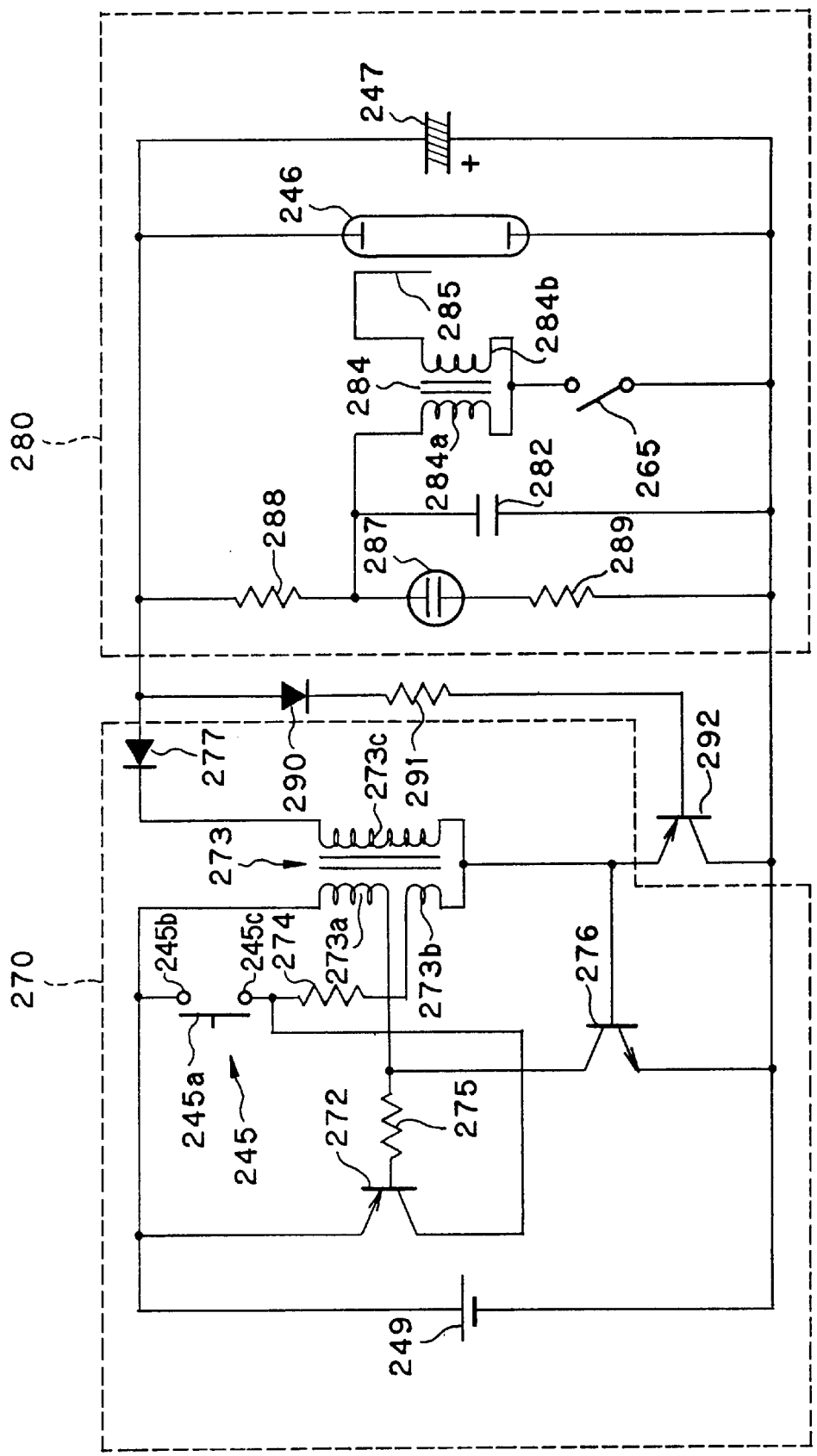
FIG. 14 is a circuit diagram of a flash device built in the film unit shown in FIG. 11.

As shown in the circuit diagram of FIG. 14, the flash assembly 219 has a booster circuit 270 and a discharge circuit 280. In the booster circuit 270, the positive pole of the battery 247 is connected to emitter of a control transistor 272 and a second terminal of a primary coil 273a of an oscillating transformer 273, and through the charge switch 245 and a resistor 274 to a third terminal of a tertiary coil 273b of the transformer 273. Collector of the control transistor 272 is connected through the resistor 274 to the third terminal of the tertiary coil 273b. A fourth terminal, which is a common terminal of the tertiary coil 273b and a secondary coil 273c, is connected to base of an oscillation transistor 276. Base of the control transistor 272 is connected to collector of the oscillation transistor 276 and through a resistor 275 to a first terminal of the primary coil 273a.

Emitter of the oscillation transistor 276 is connected to a negative pole of the battery 249 and a positive side of the discharge circuit 280. Once the charge switch 245 is turned on, the oscillation transistor 276 starts oscillating because of positive feedback from the transformer 273. After the charge switch 245 is turned off, a bias voltage is applied to the base of the oscillation transistor 276 because of positive feedback from the collector of the control transistor 272 through the resistor 274 and the tertiary coil 273b, so that the oscillation transistor 276 continues oscillating.

A fifth terminal of the secondary coil 273 is connected to cathode of a diode 277 whose anode is connected to a negative side of the discharge circuit 280. While the oscillation transistor 276 oscillates, a high voltage is generated across the secondary coil 273c in accordance with the turn ratio of the primary coil 273a to the secondary coil 273c. Due to the diode 277, only the current flowing in a direction from the fifth to the fourth terminal of the secondary coil 273c is supplied to the discharge circuit 280.

The discharge circuit 280 is constituted of the main capacitor 247, a triggering capacitor 282, a synchronizing switch 265, a triggering transformer 284, a triggering electrode 285, the flash discharge tube 246, a neon lamp 287, and so forth. The current from the booster circuit 270 is charged in the main and triggering capacitors 247 and 282. The neon lamp 287 is connected in parallel to the main capacitor 247 through resistors 288 and 289 respectively. When the main capacitor 247 is charged up to its normal charge voltage of 300 volts, the neon lamp 287 starts lighting intermittently. The light from the neon lamp 287 is visible through an indication aperture formed through the rear cover 221.

The synchronizing switch 265 is turned on when a shutter blade is opened up. Then, the triggering capacitor 282 discharges current to a primary coil 284a of the triggering transformer 284. As a result, a high voltage trigger signal is applied to the triggering electrode 285 that is connected to a secondary coil 284b of the transformer 284. Due to the high voltage on the triggering electrode 285 ionizes Xenon gas in the flash discharge tube 246 to break the resistance, so that the main capacitor 247 discharges to make the flash discharge tube 246 flash.

An anode of a Zener diode 290 is connected to the negative terminal of the main capacitor 247, and cathode f the Zener diode 290 is connected to base of an anti-oscillation transistor 292 through a resistor 291. An emitter of the anti-oscillation transistor 292 is connected to the fourth terminal of the oscillation transformer 273 and a base of the oscillation transistor 276. A collector of the anti-oscillation transistor 292 is connected to the negative pole of the battery 249 and the positive side of the discharge circuit 280.

The Zener diode 290 has a Zener voltage of 300 volts, so that the Zener diode 290 conducts Zener current from the cathode to the anode when the main capacitor 247 is charged up to the normal charge voltage of 300 volts, that is, when the voltage at the negative terminal of the main capacitor 247 reaches 300 volts. The Zener current activates the anti-oscillation transistor 292 to block the current from the base of the oscillation transistor 276. In this way, the oscillation transistor 276 is turned off, and thus the control transistor 272 is turned off, deactivating the booster circuit 70.

However when the main capacitor 247 discharges current through the flash discharge tube 246, a reactivation pulse is generated with a peak voltage more than an operating voltage of the oscillation transistor 276, e.g. 0.7 volts in this instance. The reactivation pulse is applied to the base of the oscillation transistor 276 through the rectifying diode 277 and the secondary coil 273c. Thereby, the potential level on the base of the oscillation transistor 276 raises to provide a potential difference from the emitter as the ground. That is, the base voltage is applied to the oscillation transistor 276, so that the base current flows to activate the oscillation transistor 276.

Upon activation of the oscillation transistor 276, the control transistor 272 restarts operating. In this way, the main capacitor 247 starts being charged immediately after the discharge, till it is charged up to the normal charge voltage. Accordingly, the flash assembly 219 is able to flash at any time once the charge switch 245 is turned on, unless the charge of the main capacitor 247 goes below a threshold level due to its natural discharge. As will be described in detail later, the charge switch 245 is turned on by the barrier plate 215 being moved to open the taking lens 209 and the viewfinder 208.

The view changing plate 242, which is pivotal about the pivot 243, has a cinematic view window 242a having an aspect ratio of 1.5, a panoramic view window 242b having an aspect ratio of 3.0, and an arced cutout 242c for exposing the taking lens 209 to the front. Centers of the view windows 242a and 242b are disposed on a circle which is coaxial with the pivot 243 and which extends across an optical axis 208b of the viewfinder 208. The barrier plate 215 is mounted to be slidable in between the view changing plate 242 and the front cover 220. The view changing plate 242 has a cam follower pin 242d on its front side, through which the view changing plate 242 is interconnected with the barrier plate 215.

Figure 16:
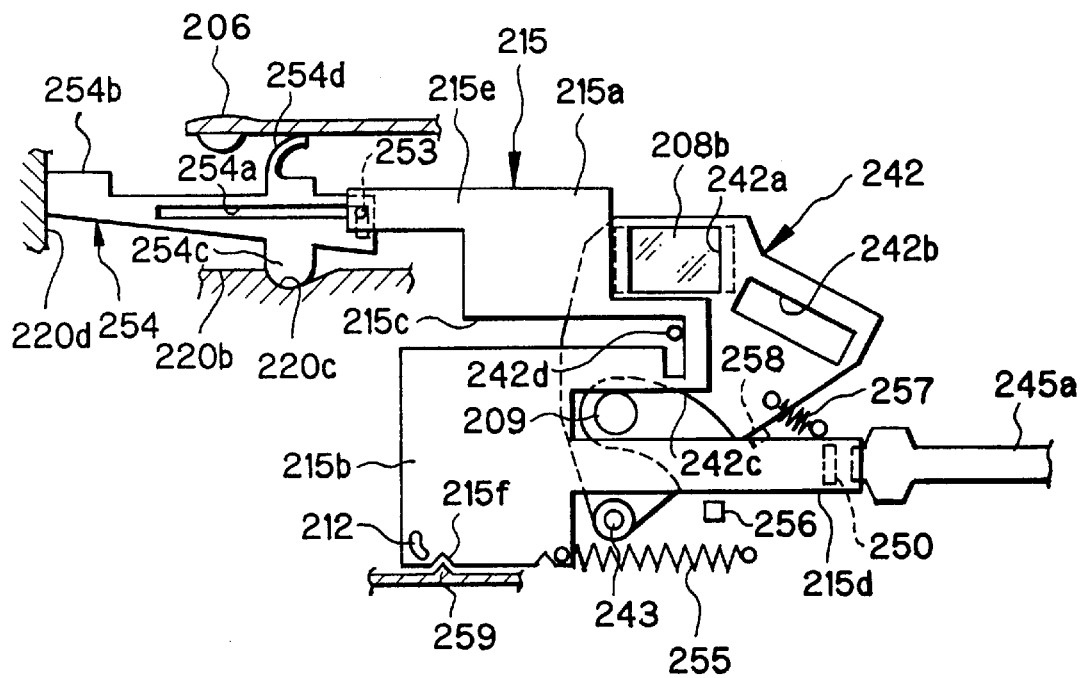
FIG. 16 is an explanatory front view of the print format selection device of the fourth embodiment in a cinematic position.
Figure 17:
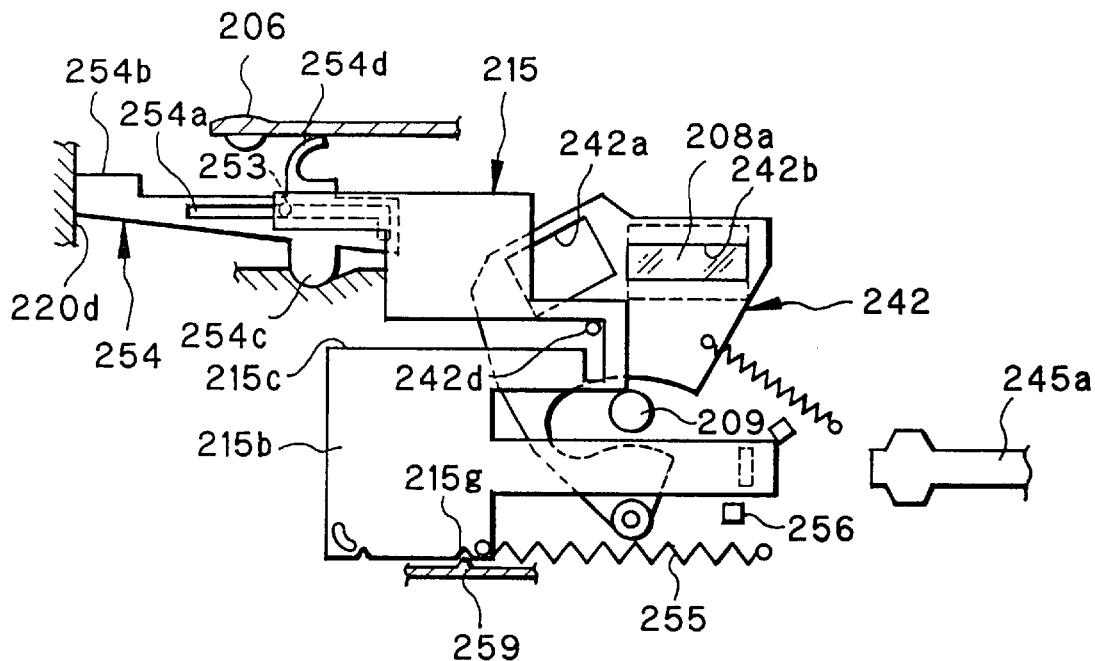
FIG. 17 is an explanatory front view of the print format selection device of the fourth embodiment in a panoramic position.
Figure 18:
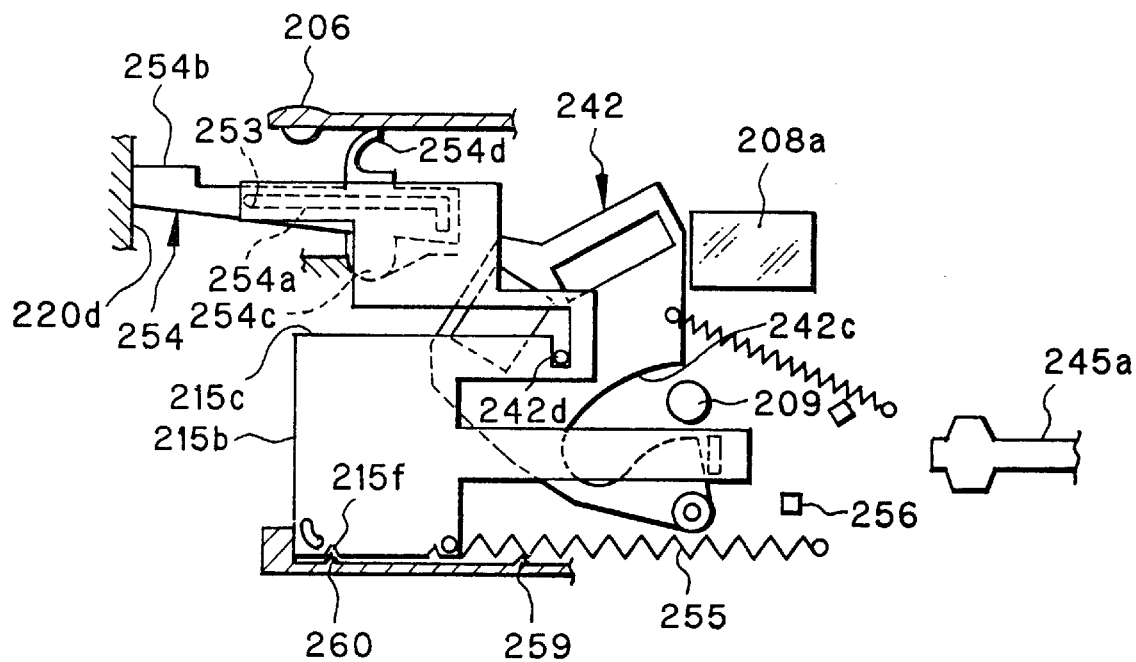
FIG. 18 is an explanatory front view of the print format selection device of the fourth embodiment in a high-vision position.

The viewfinder 208 originally has a field of view that corresponds to the H size exposure aperture 228. That is, where the view changing plate 242 is not inserted in front of an objective lens 208a of the view finder 208, as shown in FIG. 18, the view field is set in the H size. Where the cinematic view window 242a is placed right in front of the objective lens 208a, as shown FIG. 16, the view field is limited to the C size aspect ratio. Where the panoramic view window 242b is placed right in front of the objective lens 208a, as shown in FIG. 17, the view field is limited to the P size aspect ratio.

The barrier plate 215 has an upper finder barrier portion 215a, an lower lens barrier portion 215b and a L-shaped cam slot 215c formed between these two portions 215a and 215b. When the barrier plate 215 is in its closing position shown in FIG. 15, the finder barrier portion 215a covers the front of the objective lens 208a, and the lens barrier portion 215b covers the front of the taking lens 209. The cam follower pin 242d on the front of the view changing plate 242 is engaged in the slot 215c.

Figure 15:
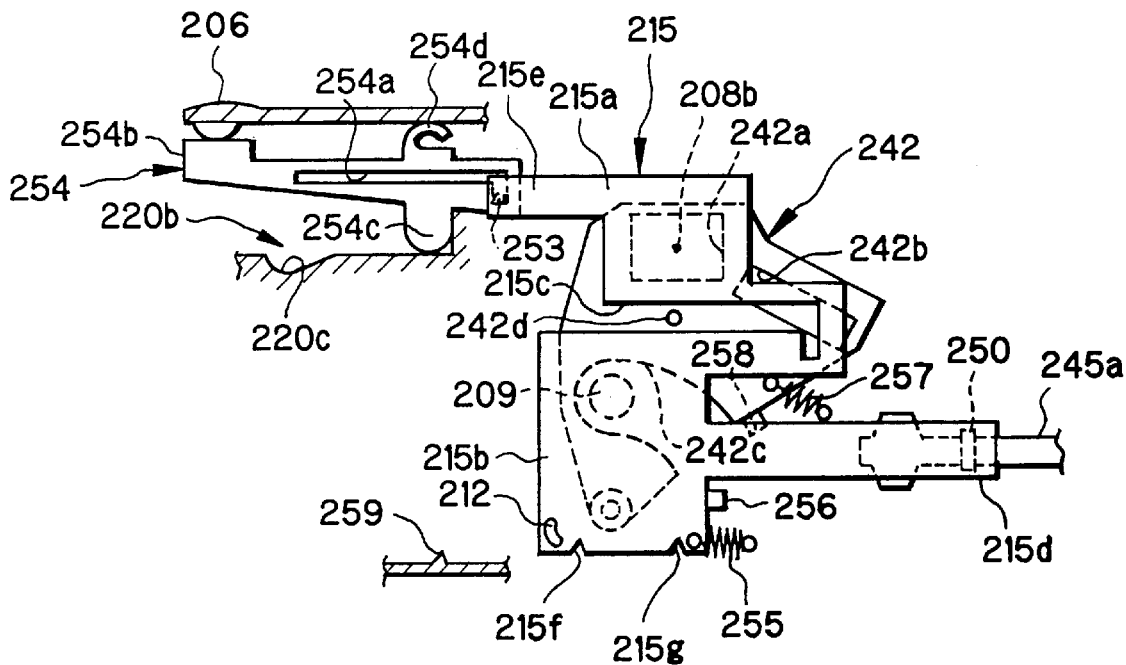
FIG. 15 is an explanatory front view of the print format selection device of the fourth embodiment in a closing position.
Figure 19A:
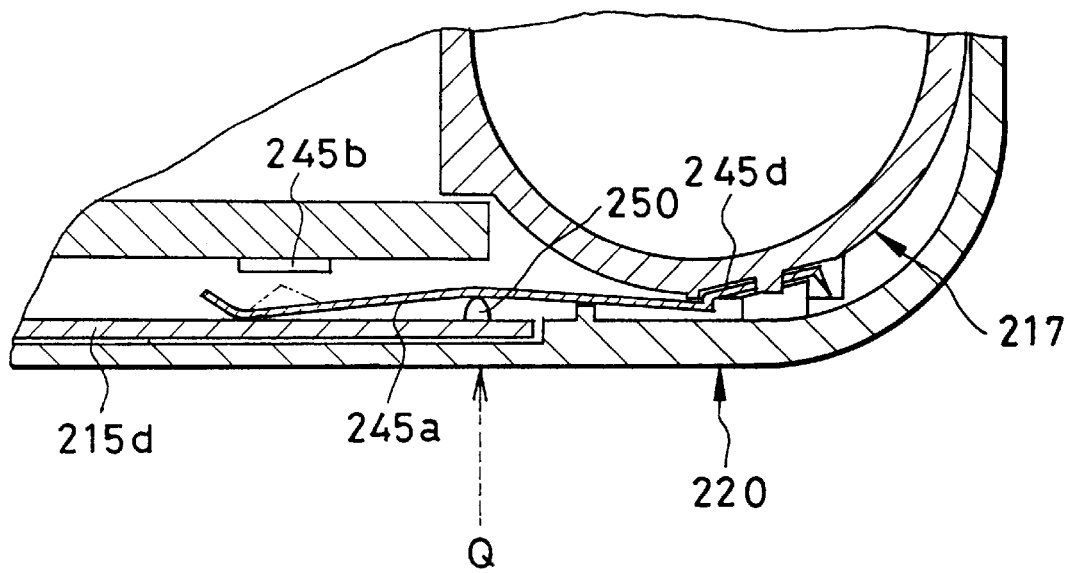
FIGS. 19A and 19B are fragmentary sectional views of the film unit shown in FIG. 11, illustrating the cooperation of a barrier plate with a charge switch of a built-in flash device of the film unit.

The barrier plate 215 also has a charge start arm 215d extending from its lower portion to the right in the drawings. The charge start arm 215d has a pushing boss 250 on the rear side of its free end, as shown in FIG. 19A. The pushing boss 250 pushes the contact plate 245a onto the contact chips 245b and 245c to turn the charge switch 245 on, while the barrier plate 215 is slid to open the viewfinder 208 and the taking lens 209.

Where the barrier plate 215 is in the closing position as shown in FIGS. 15 and 19A, the pushing boss 250 of the charge start arm 215d is in a position Q where the pushing boss 250 does not push the contact plate 245a that is nipped at its base portion 245d between the basic portion 217 and the front cover 220. On the way to move the knob 212 from this closing position to the position C, the pushing boss 250 pushes the contact plate 245a onto the contact chips 245b and 245c , as shown by phantom lines in FIG. 19B. When the knob 212 stops at the position C, the pushing boss 250 is separated from the contact plate 245d, as shown in solid line in FIG. 19B. Although the charge switch 245 is turned off in this position C, the flash assembly 219 continues charging as set force above.

The barrier plate 215 further has a shutter button lock arm 215e extending from an upper corner of the finder barrier portion 215a toward the cartridge chamber 231, i.e. to the left in the drawings. The shutter button lock arm 215e has a pin 253 on the rear side of its free end, and the pin 253 is engaged in an L-shaped cam groove 254a of a shutter button lock member 254. The shutter button lock member 254 has a lock portion 254b at its left end in the drawings, a bottom protuberance 254c, and a resilient projection 254d on the opposite side of the bottom protuberance 254c. The bottom protuberance 254c is guided along a cam groove 220b formed in the front cover 220 in opposition to the shutter button 206.

As shown in FIG. 15, the barrier plate 215 is kept urged by a spring 255 toward the closing position where the barrier plate 215 is stopped by a stopper 256 and the finder barrier portion 215a and the lens barrier portion 215b shield the viewfinder 208 and the taking lens 209 from outside. In the closing position of the barrier plate 215, the pin 253 at the free end of the shutter button locking arm 215e is in a bottom terminal of the L-shaped cam groove 254a of the shutter button lock member 254. In this position, the shutter button lock member 254 is in its lock position where the lock portion 254b is underneath the free end of the shutter button 206, and the resilient projection 254d is depressed by a base portion of the shutter button 206, so that the shutter button 206 may not be further depressed. Hereinafter, this position of the shutter button lock member 254 will be called a locked position.

The view changing plate 242 is urged by a spring 257 to rotate in a clockwise direction in the drawings, but the clockwise rotation is limited by a stopper 258. Where the view changing plate 242 is stopped by the stopper 258, hereinafter called an initial position of the view changing plate, the cinematic view window 242a is right in front of the objective lens 208a of the viewfinder 208, as shown in FIG. 16.

The lens barrier portion 215b has click notches 215f and 215g in its bottom edge. The click notches 215f and 215g is engageable with a claw 259 that is formed on the inside of the front cover 220. By sliding the knob 212 to the left, the barrier plate 215 moves in the direction to open the viewfinder 208 and the taking lens 209. When the knob 212 reaches the position C, the click notch 215f gets into engagement with the claw 259, as shown in FIG. 16. While the knob 212 and thus the barrier plate 215 moves from the closing position to the position C, the pin 242d of the view changing plate 242 relatively moves along the horizontal portion of the L-shaped cam slot 215c, so the view changing plate 242 stays in the initial position, and the field of view of the viewfinder 208 is limited to the C size by the cinematic view window 242a.

Figure 19B:
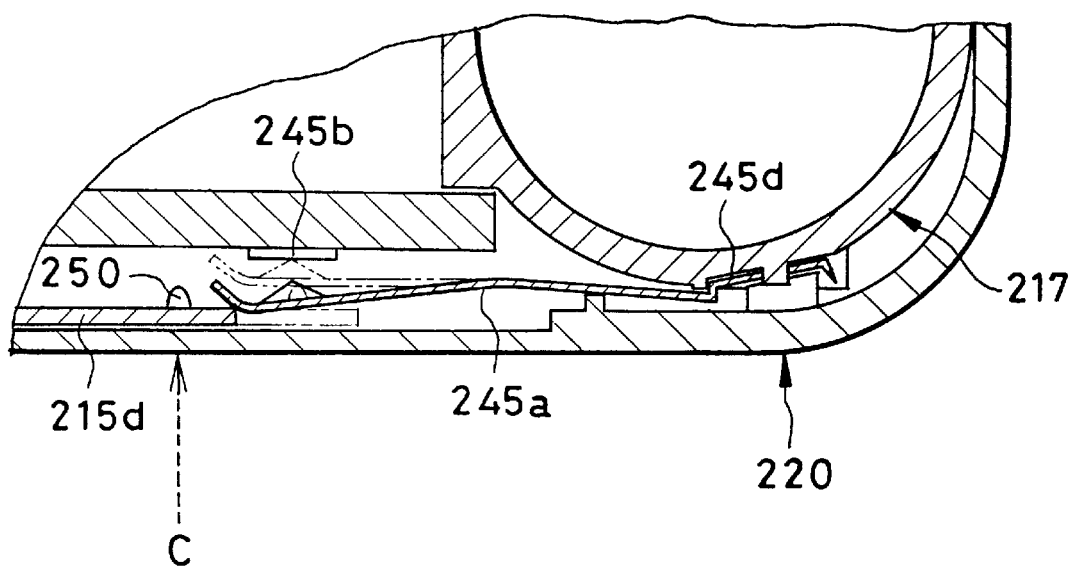

Simultaneously, the charge switch 245 is once turned on, as shown in FIG. 19B, so the flash assembly 219 starts charging. Also the pin 253 pushes the lock member 254 to the left till the bottom protuberance 254c is trapped in a recess 220c formed in the bottom of the cam groove 220b, as shown in FIG. 16. Then, the shutter button lock member 254 slightly moves down, so that the pin 253 relatively moves up to the corner of the L-shaped cam groove 250a, and the resilient projection 254d springs back to its original position. On the other hand, the left end of the shutter button lock member 254 comes to contact with an inner wall portion 220d of the front cover 220, and the lock portion 254b is removed from the shutter button 206, enabling it to be depressed. Hereinafter, this position of the shutter button lock member 254 will be called an unlocked position.

When the knob 212 is slid from the position C further to the left, the pin 242d is pushed by the vertical edge of the L-shaped cam slot 215c, so the view changing plate 242 rotates counterclockwise. Because of the force of the spring 257, the pin 242d is maintained contact with the vertical edge of the cam slot 215c during this counterclockwise rotation. When the knob 212 reaches the position P, the second notch 215g is caught on the claw 259, as shown in FIG. 17. In this position, the panoramic view window 242b is right in front of the objective lens 208a, limiting the field of view to the P size. Meanwhile the pin 253 moves along the horizontal portion of the L-shaped cam groove 254a, so the shutter button lock member 254 stays in the unlocked position.

When the knob 212 is slid from the position P to the left, the view changing plate 242 rotates further in the counterclockwise direction as the pin 242d is pushed by the vertical edge of the cam slot 215c. When the knob 212 reaches the position H, the first click notch 215f is caught on a second claw 260 that is formed on the left side of the claw 259. In this position, the view changing plate 242 retracted from the front of the objective lens 208a, so that the field of view is set in the original H size. The pin 53 moves along the horizontal portion of the cam groove 254a to reach the left terminal of the cam groove 254a.

Figure 20A:
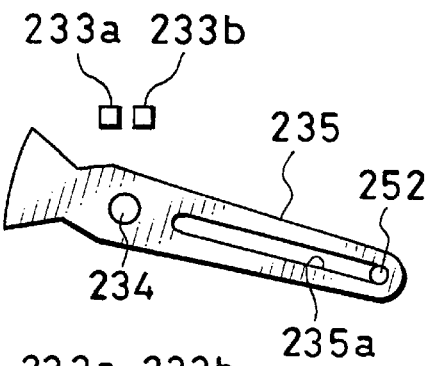
FIGS. 20A, 20B, 20C and 20D are explanatory views illustrating the operation of a data switching blade of the print format selection device of the fourth embodiment.

The engagement between the click notch 215f or 215g and the claw 259 is weaker than the force of the spring 255, so the photographer must retain the knob 212 by the right hand finger to keep the barrier plate 215 from returning to the closing position. Thereby, the right hand finger of the photographer is kept away from a photographic field of the taking lens 209 during the photography, especially when the H size is selected. Since the finger is less likely to touch the taking lens 209, this configuration is preferable also in terms of keeping the taking lens 209 clean. In addition to the protection by the lens barrier portion 215b, the taking lens 209 of the film unit 201 is more likely to be kept in a reusable condition. This is advantageous for the sake of recycling the film unit 201.

Where the knob 212 is in its right end position corresponding to the closing position of the barrier plate 215, also the interconnection rod 252 is in its right end position in the drawings, i.e. in the nearest position to the film roll chamber 232. Since the free end of the interconnection rod 252 is inserted in a slot 235a of the data switching blade 235, also the data switching blade 235 is rotated fully to the right as shown in FIG. 20A. In this position, the data openings 233a and 233b are not closed by the data switching blade 235. In the closing position, however, the shutter button 206 is locked by the shutter button lock member 254, and the charge switch 245 is in the off state as shown in FIG. 19A. Therefore, no dots are recorded through the openings 233a and 233b.

Figure 20B:
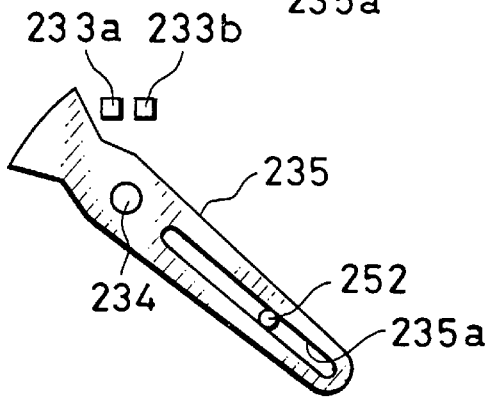

When the knob 212 is slid from the right end position to the position C, the data switching blade 235 rotates clockwise through a given angle along with the movement of the interconnection rod 252, as shown in FIG. 20B. Also in this position, both the data openings 233a and 233b are still opened. Because the shutter button 206 is unlocked and the flash assembly 219 is charged in this position, two dots are recorded as the print format data designating the C size on a margin of an H size picture frame simultaneously with an exposure responsive to one depression of the shutter button 206, in the same way as shown in FIG. 7B.

Figure 20C:
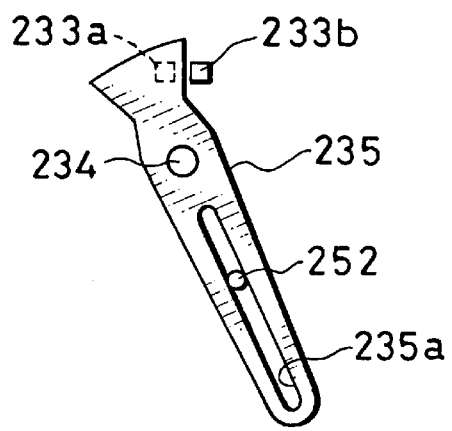
Figure 20D:
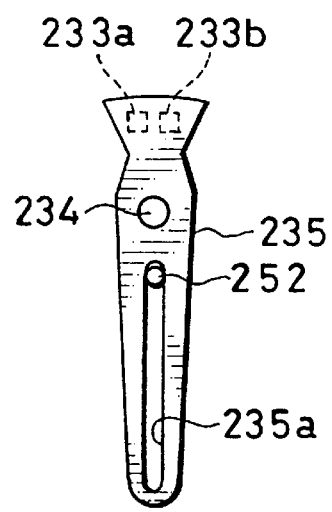

When the knob 212 is placed at the position P, the data switching blade 235 rotates to a position closing one of the data openings 233a and 233b, as shown in FIG. 20C. When the shutter button 206 is depressed in this position, only one dot is recorded on a margin of an H size picture frame, as the print format data designating the P size, in the same way as shown in FIG. 7A. When the knob 212 is placed at the position H, the data switching blade 235 closes both the data openings 233a and 233b. Accordingly, no dot is recorded on a margin of an H size picture frame that is photographed while the P size is selected by the knob 212, in the same way as in FIG. 7C.

The film unit 201 having the above described configuration operates as follows:

First the film advancing wheel 213 is rotated to position an unexposed frame of the filmstrip 223 behind the exposure aperture 228. Then, the knob 212 is moved to open the barrier plate 215 and is set in one of the three positions C, P and H to select one of the three print formats. As the field of view changes in accordance with the position of the knob 212, and the click notch 215g or 215f is caught on the claw 259 or 260 at each position C, P or H, the photographer can confirm the position of the knob 212 while framing through the viewfinder 208. When the knob 212 is moved to open the barrier plate 215, the pushing boss 250 of the charge start arm 215d pushes the contact plate 245a to turn on the charge switch 245. Once the charge switch 245 is turned on, the flash assembly 219 charges the main capacitor 247 to the normal voltage, and repeats charging after each flashing of the flash discharge tube 246. Therefore, the flash assembly 219 automatically get ready for flashing once the barrier plate 215 is opened.

For example, when the photographer depresses the shutter button 206 after framing with the P size view field, the synchronizing switch 265 of the flash assembly 219 is closed by the shutter mechanism of the exposure assembly 218, so that the flash discharge tube 246 flashes. The light from the flash discharge tube 246 is mainly projected through the flash window 211 toward the photographic subject, but some is transmitted from one end 236a to the other end 236b of the light guide 236, and is projected toward the data openings 233a and 233b. However, since the data opening 233a is closed by the data switching blade 235 in this P size position, the light travels through the second opening 233b alone, to record only one dot as the P size print format data beside an H size picture frame.

At the conclusion of photography, the photographer releases the knob 212, so the barrier plate 215 returns to the closing position under the force of the spring 255, and the view changing plate 242 returns to the initial position under the force of the spring 257. As a result, the viewfinder 208 and the taking lens 209 are closed by the finder barrier portion 215a and the lens barrier portion 215b. At the same time, the shutter button lock member 254 is moved to the right through the movement of the pin 253 of the shutter button lock arm 215e, and returns to the lock position where the lock portion 250b is inserted underneath the shutter button 206. In this way, the shutter button 206 is prevented from being depressed, and thus the flash discharge tube 246 is prevented from flashing, so that no dots will be accidentally recorded so long as the barrier plate 215 is closed.

To restart the photography, the photographer opens the barrier plate 215 by sliding the knob 212, and repeats the same operation as above. As the charge switch 245 is turned on again at that time, the flash assembly 219 is automatically charged to permit flashing and recording the print format data synchronously with the exposure. Because the flash assembly 219 repeats charging in response to the reactivation pulse that is generated at each flashing, it is possible to take pictures successively while winding up the filmstrip 223 frame by frame without closing the barrier plate 215.

The film unit 201 after finishing the exposures of the filmstrip 223 is forwarded to a photofinisher, and the exposed filmstrip 233 is processed and printed in accordance with the recorded print format data in the same way as described with respect to the first embodiment.

Figure 21:
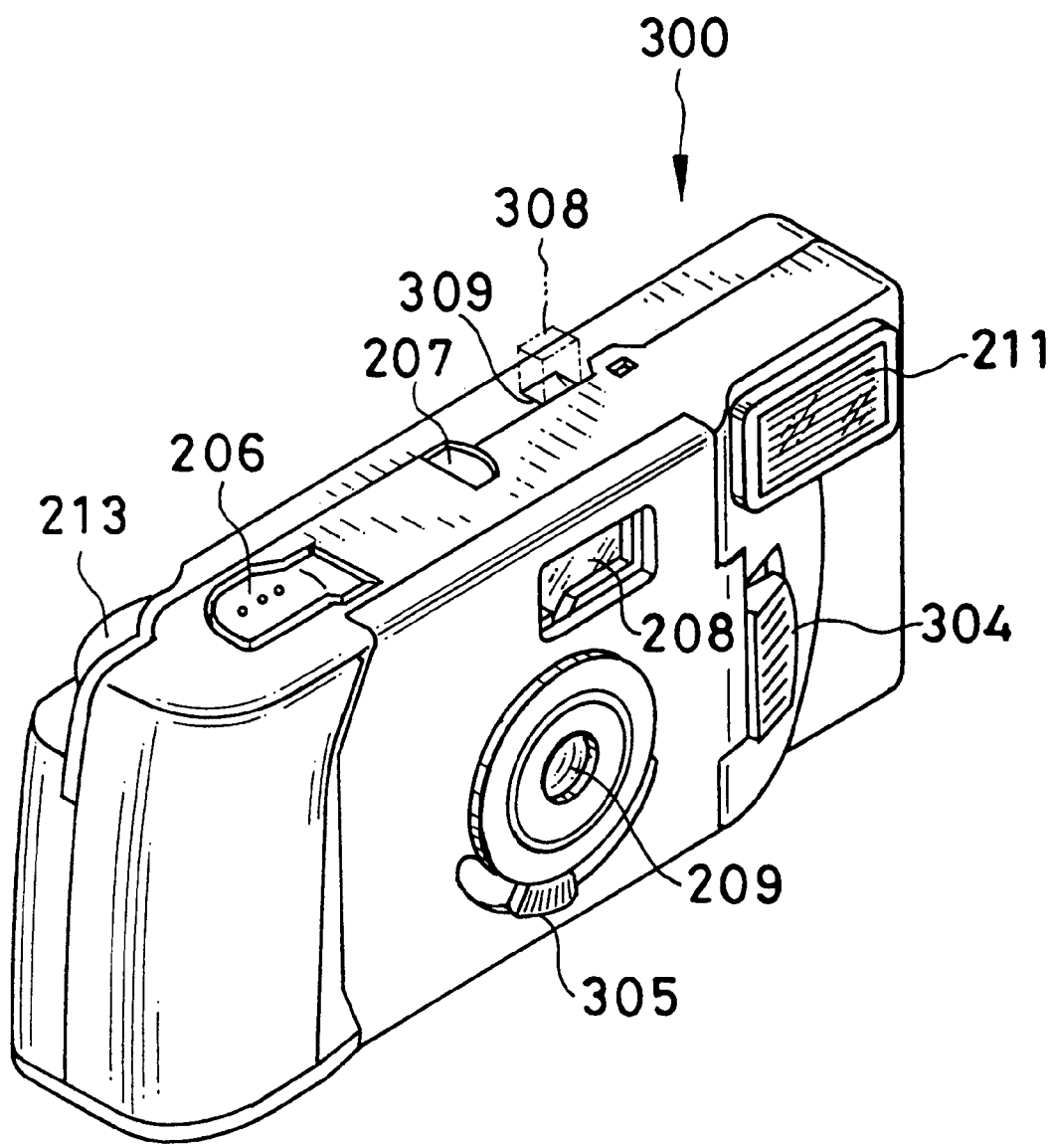
FIG. 21 is a perspective view of a film unit with a print format selection device according to a fifth embodiment of the invention.

FIG. 21 shows a film unit 300 according to a fifth embodiment of the invention. The film unit 300 is provided with a shutter button 206, a frame counter window 207, a viewfinder 208, a taking lens 209, and a flash window 211, a film winding wheel 213. In addition, a charge switch operation device 304 is disposed below the flash window 211, and a knob 305 is provided below the taking lens 209 so as to be slidable along an arced slot 350 (see FIG. 23) around the taking lens 209. On one side of the frame counter window 207 is formed an indication window 309 for a charge condition indicator 308.

Figure 22:
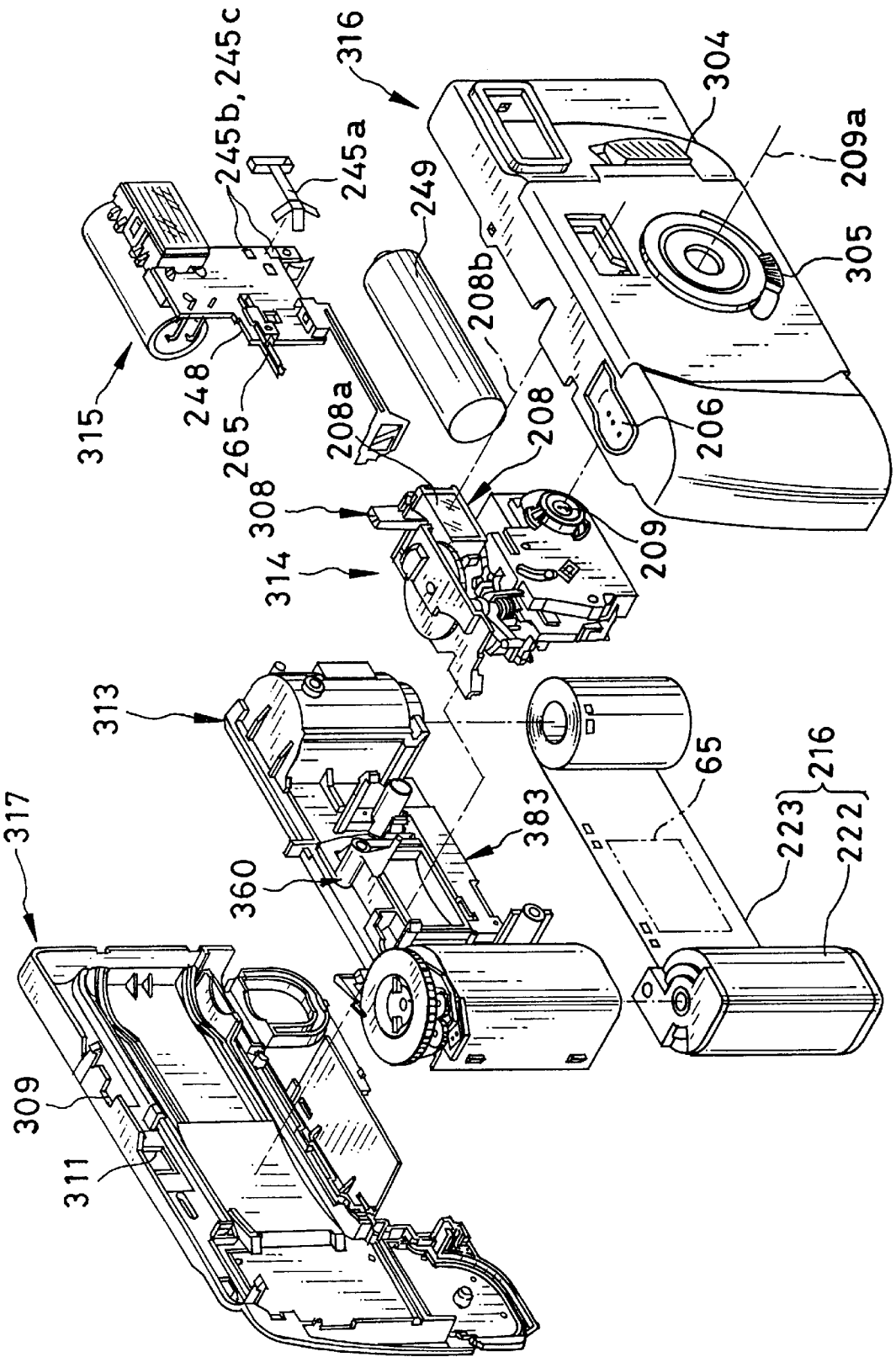
FIG. 22 is an explosed perspective view of the film unit shown in FIG. 21.

As shown in FIG. 22, the film unit 300 is constituted of a basic portion 313 containing a photo film cartridge 216, an exposure assembly 314 and a flash assembly 315 which are attached to the front of the basic portion 313, a front cover 316 covering the front of the basic portion 313, and a rear cover 317 covering the rear of the basic portion 313. The fundamental constructions of these parts 313 to 317 are equivalent to those having the same names in the above embodiments. Accordingly, the following description relates merely to those elements essential for the fifth embodiment.

The charge switch operation device 304 is slidable in a vertical direction, and is moved to an upper position for flash photography. Then, the charge condition indicator 308 pops up through the indication window 309 as is implied by the phantom lines in FIG. 21. The charge condition indicator 308 starts lighting when the flash assembly 315 completes charging. Designated by 249 is a battery for charging the flash assembly 315.

Figure 23:
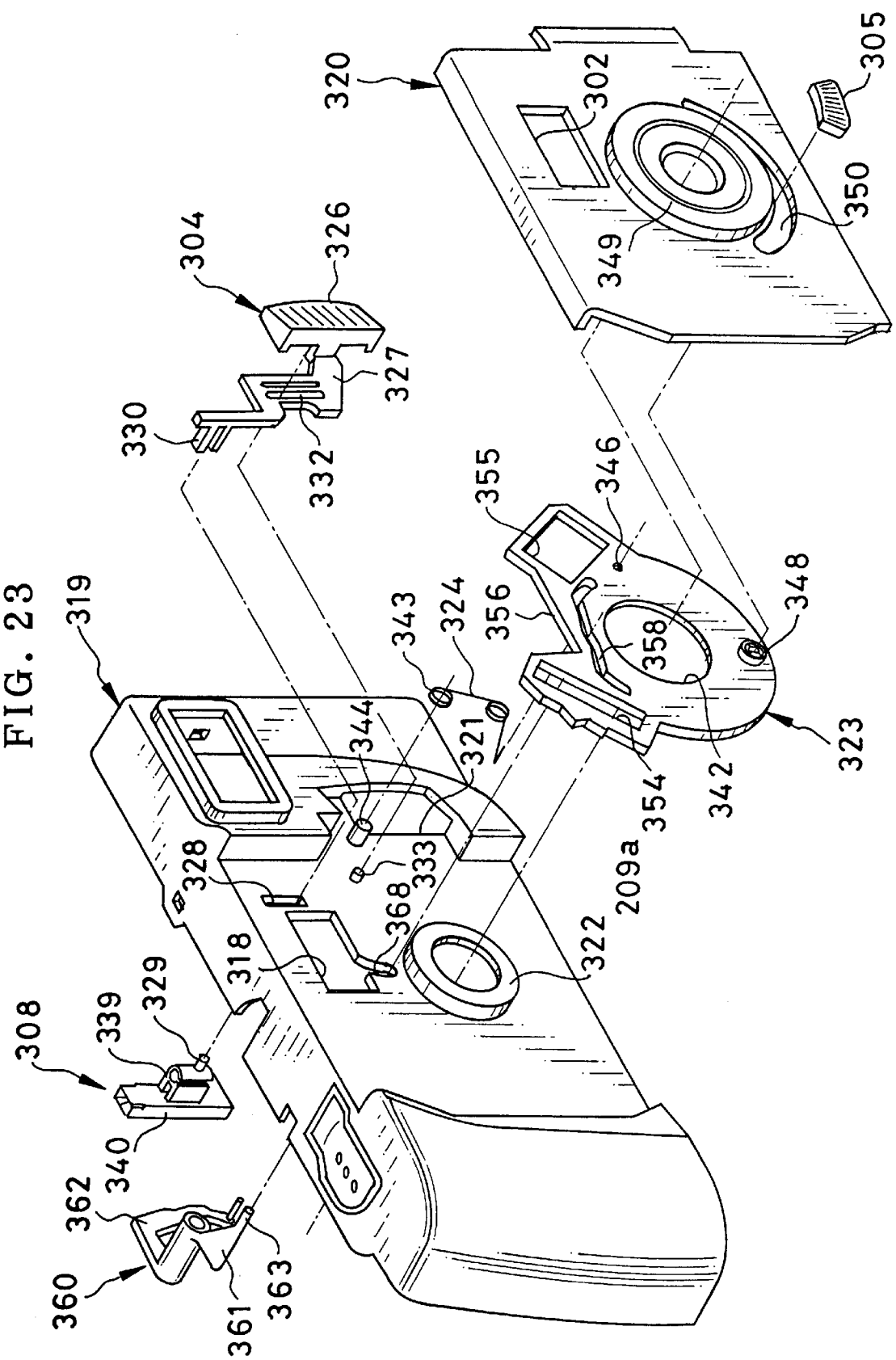
FIG. 23 is an exploded perspective view of a front cover of the film unit shown in FIG. 21, illustrating a view changing plate of the print format selection device of the fifth embodiment.

As shown in FIG. 23, the front cover 316 consists of a cover main body 319 and a front panel 320. The cover main body 319 has a finder window 318 that is disposed in front of an objective lens 208a of the viewfinder 208, and the front panel 320 has an objective window 302 that is equal in shape and size to the finder window 318, and is disposed in alignment with the finder window 318. The charge switch operation device 304 is mounted in between the front panel 320 and the main cover body 319 at front of an opening 321 formed through the cover main body 319. A view changing plate 323 is fitted on a cylindrical lens barrel 322 so as to be rotatable about an optical axis 209a of the taking lens 209. A toggle spring 324 is suspended between the view changing plate 323 and the cover main body 319.

The charge switch operation device 304 has a button member 326 that is exposed to the outside, a base plate 327 that is mounted to the front of the cover main body 319, and an engaging portion 330 that is inserted in a vertical slot 328 formed through the cover main body 319, and is engaged with a pin 329 formed on a front side of the charge condition indicator 308. The charge switch operation device 304 is thus slidable along the vertical slot 328.

The base plate 327 has a vertical slot 332, which accepts a pin 333 that is formed on the front of the cover main body 319. The vertical slot 332 has notches, so that the pin 333 clicks with the notch while the charge switch operation device 304 is slid up and down.

The button member 326 is disposed in front of the opening 321, and has a not-shown boss in its rear side. When the button member 326 is moved to the upper position, the boss pushes a contact plate 245a onto a pair of printed contact chips 245b and 245c formed on a printed circuit board 248 of the flash assembly 315, causing the flash assembly 315 to start charging.

The charge condition indicator 308 is formed from a transparent plastic material, and is attached to the exposure assembly 314 through a mounting sleeve 339. The pin 329 is formed on the front surface of the mounting sleeve 339. The charge condition indicator 308 further has a light guide portion 340. In the upper position of the charge switch operation device 304, the light guide portion 340 faces an indication lamp element of the flash assembly 315, which is not shown but mounted to the rear side of the printed circuit board 248 and emits light for indicating the completion of charging. The light from the indication lamp element is conducted through the light guide portion 340, and is projected to the outside of the film unit 300 through an upper end of the light guide portion 340 that pops up from the opening 309.

The view changing plate 323 is formed from the same plastic material that is used for forming the cover main body 319 and the front panel 320. The view changing plate 323 has a round hole 342 which is coaxial with the optical axis 209a of the taking lens 209 when fitted on the lens barrel 322, and a small hole 346 for inserting one end 324a of the toggle spring 324. An opposite coiled end 324b of the toggle spring 324 is fitted on a pin 344 that is formed on the cover main body 319.

A boss 348 is integrally formed on a lower front portion of the view changing plate 323. The boss 348 is inserted in the arced slot 350 that is formed under a ring-like lens hood 349 that protrudes forward from the front panel 320. The knob 305, which is larger than the boss 348, is attached from the front to the boss 348. Separating the knob 305 from the view changing plate 323 in this way allows to make the slot 350 narrower while maintaining good handling properties of the knob 305. The narrower slot 350 is desirable for the interest of keeping the interior of the film unit 300 from exposure to ambient light.

The view changing plate 323 has in its peripheral portions a panoramic view window 354 corresponding to the P size print format and a cinematic view window 355 corresponding to the C size print format, and a cutout 356 disposed between these windows 354 and 355. Centers of the view windows 354 and 355 are disposed on a circle which is coaxial with the optical axis 209a of the taking lens 209 and which extends across an optical axis 208b of the viewfinder 208. By operating the knob 305 to rotate the view changing plate 323, one of the panoramic view window 354, the cinematic view window 355 and the cutout 356 is placed in front of the objective lens 208a of the viewfinder 208, i.e. in between the objective window 302 and the finder window 318.

Figure 24:
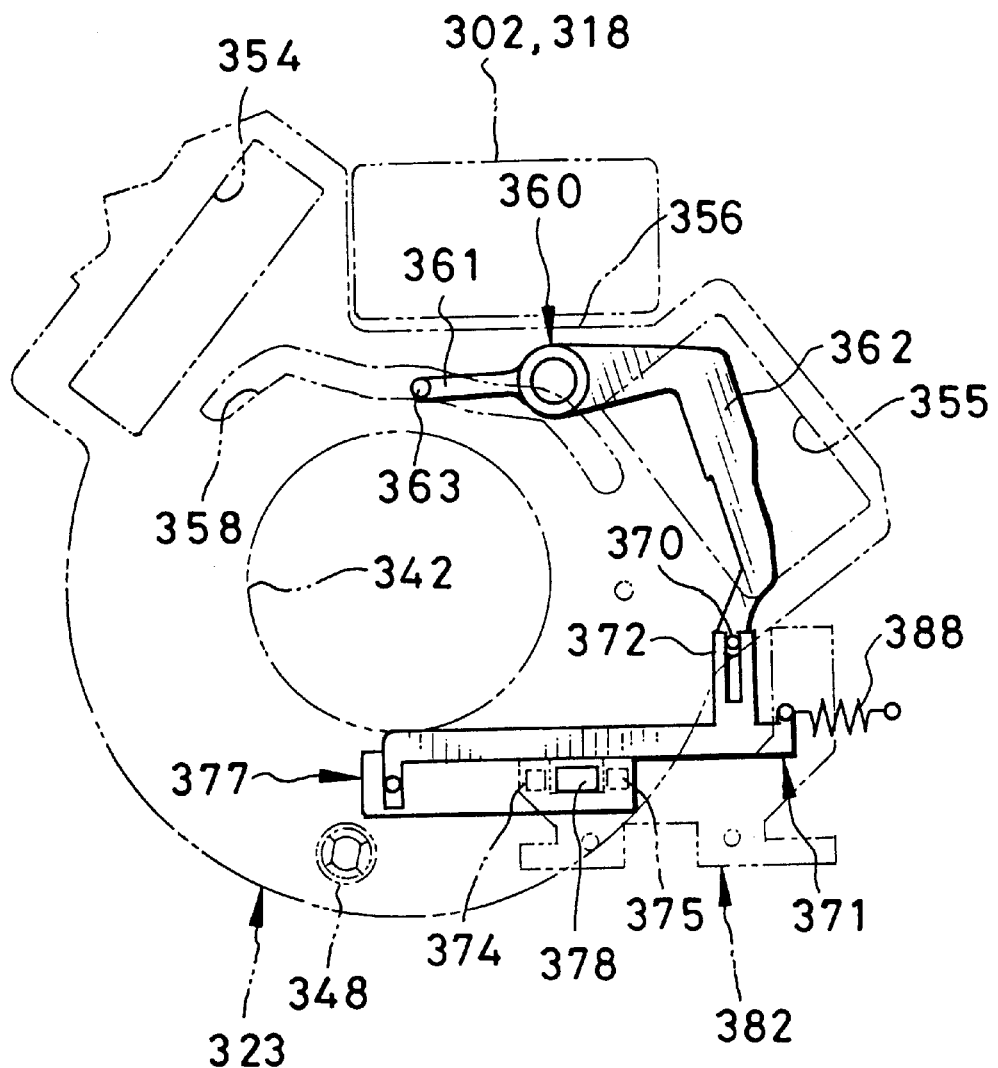
FIG. 24 is an explanatory front view of the print format selection device of the fifth embodiment in a high-vision position.

Also in this film unit 300, every picture frame is recorded in the H size, so that the objective window 302 and the finder window 318 are designed to provide a high vision view field corresponding to the H size photographic field. The cutout 356 of the view changing plate 323 is so sized that it does not interfere in the high vision view field when it is placed in between the objective window 302 and the finder window 318, as shown in FIGS. 21 and 24. The film unit 300 is initially set in a state where the cutout 356 is placed in between the objective window 302 and the finder window 318, so that the viewfinder 208 initially provides the high vision view field.

Figure 25:
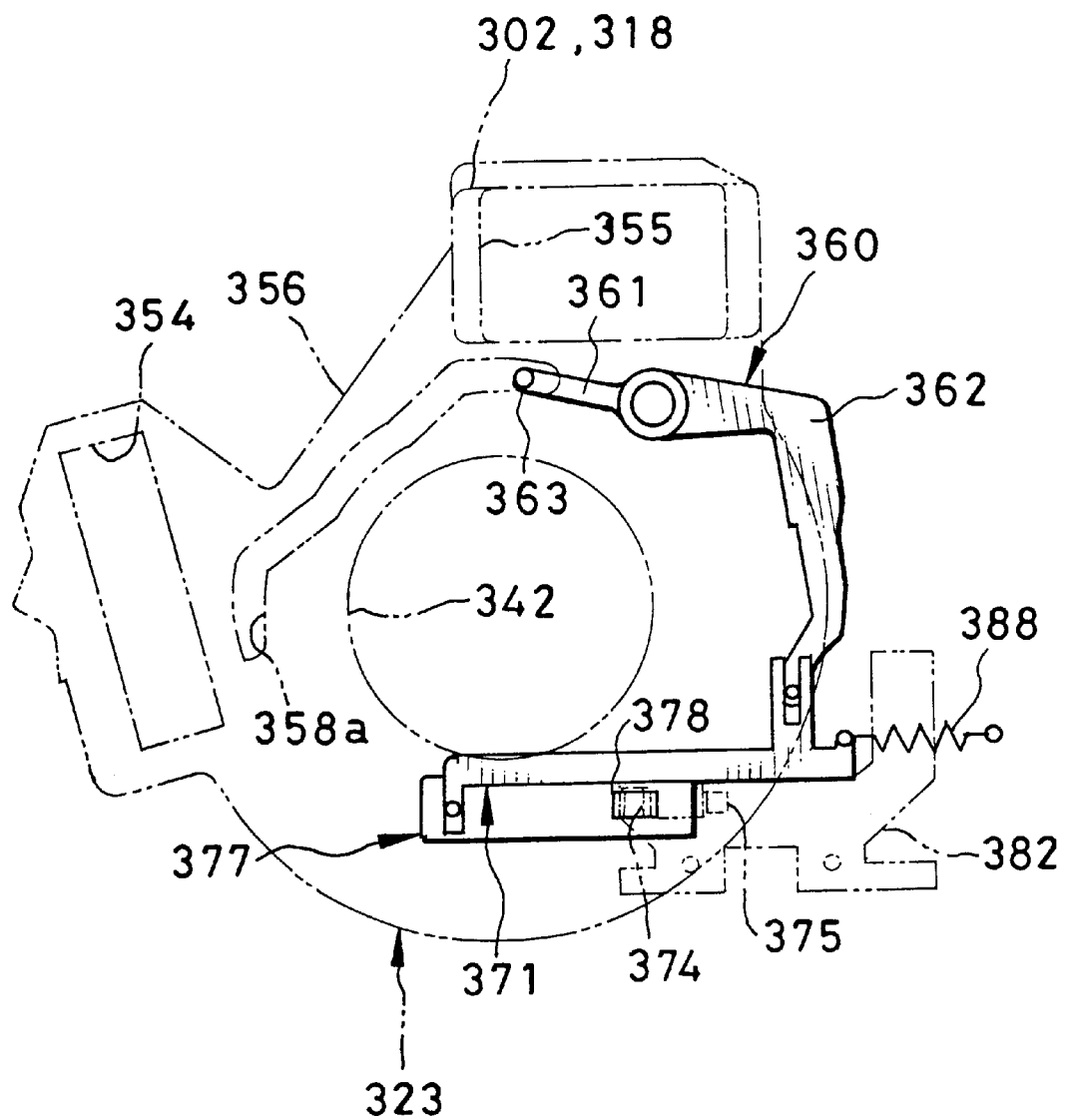
FIG. 25 is an explanatory front view of the print format selection device of the fifth embodiment in a cinematic position.
Figure 26:
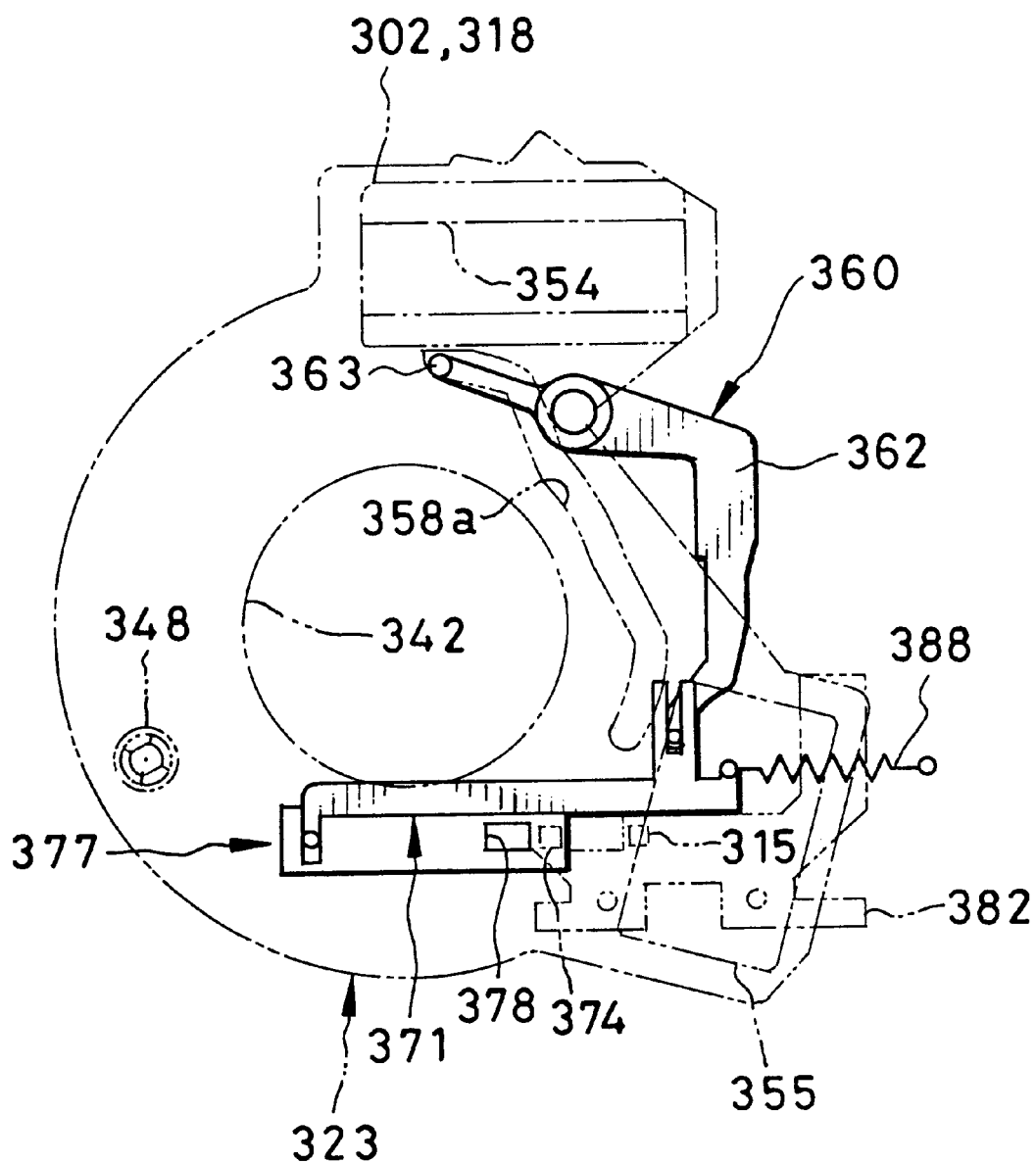
FIG. 26 is an explanatory front view of the print format selection device of the fifth embodiment in a panoramic position.

When the cinematic view window 355 is inserted in between the objective window 302 and the finder window 318, the field of view of the viewfinder 208 is limited to the C size, as shown in FIG. 25. When the panoramic view window 354 is inserted in between the objective window 302 and the finder window 318, the field of view of the viewfinder 208 is limited to the P size, as shown in FIG. 26. The toggle spring 324 is adapted to stop the view changing plate 323 at each of the above three rotational positions providing the H size, C size and P size view fields. As the cutout 356 is disposed between the windows 354 and 355 in the view changing plate 323, a less rotational movement of the knob 305 is necessary for changing the field of view from the H size to either of the other sizes, in comparison with a case where the H size selecting position of the knob is not in the middle of the three sizes, like the embodiments of FIGS. 1 and 11.

A cam slot 358 is formed in a peripheral range around the round hole 342 from the panoramic view window 354 to the cinematic view window 355. The cam slot 358 has a lot of twists, so the distance of the cam slot 358 from the center of the round hole 342, i.e. from the optical axis 209a of the taking lens 209 varies. As shown in FIGS. 23 and 27, the cam slot 358 accepts a pin 363 which is formed on a tip of an arm 361 of a rotary lever 360.

The rotary lever 360 is mounted to be rotatable on an axle 366 that is formed above an exposure chamber 365 of the basic portion 313. The arm 361 of the rotary lever 360 protrudes forwardly from the exposure chamber 365, so that a room for allowing the arm 361 to swing is formed under the viewfinder 208 that is incorporated into the exposure assembly 314, as is shown in FIG. 22. A slit 368 is formed in a bottom side of the finder window 318, as shown in FIG. 23, so that the pin 363 is inserted into the cam slot 358 of the view changing plate 323 through the slit 368. In this way, the rotary lever 360 rotates as the view changing plate 323 rotates.

The rotary lever 360 has a second arm 362 which extend along the right side of the exposure chamber 365 in the drawings, and has a pin 370 on its tip. The pin 370 is engaged with a fork 372 on one end of a slide lever 371. The slide lever 371 is mounted below the exposure chamber 365 so as to be slidable in a horizontal direction. Accordingly, the slide lever 371 slides with the rotation of the rotary lever 360.

As shown in FIG. 27, a pair of data openings 374 and 375 are formed below the exposure chamber 365, for photographically recording at most two dots as print format data on the filmstrip 223. To the front of the data openings 374 and 375A is mounted a data switching blade 377 made of thin opaque plastic film or the like. A pin 380 formed on the rear side of the slide lever 371 is fitted in a hole 379 of the data switching blade 377, so that the data switching blade 377 slides horizontally along with the slide lever 371. The data switching blade 377 has an opening 378 for uncovering the data opening 374 at a determined sliding position thereof.

A transparent plastic light guide 382 is disposed in front of the data switching blade 377, with its one end facing the data openings 374 and 375. The other end of the light guide 382 faces a light emission element 384, e.g. an LED, which is mounted to the rear side of the printed circuit board 248 of the flash assembly 315. A light shielding plate 383 is disposed in front of the light guide 328 to shield the light guide 328 and the data openings 374 and 375 from other internal portions of the film unit 300. The light shielding plate 383 also has a cylindrical portion 385 for accepting the light emission element 384. The cylindrical portion 385 also prevents the leakage of the light from the light emission element 384 to other internal portions of the film unit 300. The light emission element 384 is connected to the circuit of the flash assembly 315 such that the light emission element 384 is activated to emit light by a trigger signal that is generated when a synchronizing switch 265 of the flash assembly 315 is turned upon depression of the shutter button 206, regardless of whether the flash assembly 315 is charged or not. The light from the emission element 384 travels through the light guide 385 and is projected toward the data openings 374 and 375.

The slide lever 371 is disposed in front of the light shielding plate 383. A coiled spring 388 is suspended between a pin 389 of the slide lever 371 and the light shielding plate 383, to bias the slide lever 371 to the right in the drawings. In this way, the pin 363 of the rotary lever 360 is kept in contact with an inward cam surface 358a of the cam slot 358 of the view changing plate 323, as is shown in FIG. 24 to 26, which ensures the rotational movement of the view changing plate 323 to be transmitted to the data switching blade 377.

When the knob 305 is placed in the H size position as shown in FIG. 24, the data switching blade 377 closes both of the data openings 374 and 375, so that no dot is recorded on the margin of a photographed picture frame, in the same way as shown in FIG. 7C. When the knob 305 is placed in the C size position as shown in FIG. 25, the data switching blade 377 is retracted from the data opening 375, and the opening 378 of the data switching blade 377 is placed in front of the data opening 374, so that two dots are recorded on the margin of a photographed picture frame, in the same way as shown in FIG. 7B. When the knob 305 is placed in the P size position as shown in FIG. 26, the data switching blade 377 moves away from the data opening 375, and the opening 378 of the data switching blade 377 is retracted from the data opening 374 to close it, so that only one dot is recorded through the data opening 375 on the margin of a photographed picture frame, in the same way as shown in FIG. 7A.

Although the view changing plate 323 and thus the knob 305 is retained in one of the three switching positions by the toggle spring 324, it is possible to urge the view changing plate 323 to return to the H size position when the knob 305 is released. The view changing plate 323 may be mounted behind the front cover 316.

While the present invention has been described with respect to the film units containing the IX 240 type photo film cartridge, it is of course applicable to a film unit containing the ISO 135 type photo film cartridge and a compact camera as well. That is, the number and types of available print formats are not limited to the above three sizes. In either case, it is preferable to make the original or unmasked view field of the viewfinder correspond to an original exposure aperture of the film unit or the camera. Also the correlation between the number of dots and the print formats is not limited to the above embodiment.

Although the data openings are rectangular to record rectangular dots as the print format data, the data openings and thus dots may be round or another shape. Although the light guides used in the above embodiments have a rectangular section, the light guide may be a flexible plastic fibers having a round section each. The flash assembly need not be limited to the above embodiments. For example, the flash assembly may be a type which charges its main capacitor only while its charge switch is turned on. To apply this type to the embodiment shown in FIG. 11, the contact plate 245a and the charge start arm 215d should be elongated so that the charge start arm 215d continues pushing the contact plate 245a to keep the charge switch 245 on as long as the barrier plate 215 is opened.

In the above embodiments, a data switching blade is used in combination with a pair of light emission elements, or a light guide conducting light from a flash discharge tube or with a light guide conducting light from a single light emission element, for recording at most two dots per picture frame on the photo film as the print format data. However, it is possible to provide at least two light emission elements and change the number of those being activated among of them, by the print format selection knob in cooperation with the view changing plate.

Instead of recording image format data, it is possible to use an aperture mask device for changing the size of picture frame itself in accordance with the selected print format, and interconnect the aperture mask device to the view changing plate and/or the barrier plate of the present invention in an appropriate way.

The view changing plate of the present invention may be mounted to be rotatable in a perpendicular plane to the optical axis of the viewfinder between the objective lens and the eyepiece of the viewfinder.

Thus, the present invention should not be limited to the embodiments shown in the drawings but, on the contrary, variations and modifications are possible without departing from the scope of the present invention as specified in the appended claims.

What is claimed is:

1. A print format selection device for a camera having a viewfinder whose original field of view corresponds to a picture frame defined by an exposure aperture of the camera, the print format selection device comprising:

a manual operation member slidable at least between a first print format position for designating a picture frame to be printed in a first size corresponding to the exposure aperture, a second print format position for designating a picture frame to be printed in a second size different from the first size, and a third print format position for designating a picture frame to be printed in a third size different from the first and second sizes; and a view changing plate rotatable about an axis in cooperation with the manual operation member and having at least two different view windows whose centers are disposed on a circumference of a circle, said circle being centered on the rotational axis of the view changing plate, said circumference passing through an optical axis of the viewfinder, wherein one of the view windows is placed in the original field of view when the manual operation member is set to the second print format position, limiting the original field of view to correspond to the second size, and another of the view windows is placed in the original field of view when the manual operation member is set to the third print format position, limiting the original field of view to correspond to the third size, and wherein the rotational axis of the view changing plate coincides with an optical axis of a taking lens.

2. A print format selection device as claimed in claim 1, wherein the view changing plate has a round hole disposed coaxially with the rotational axis thereof, said round hole being fitted on a cylindrical lens barrel of the taking lens formed on a base surface of the camera disposed behind a front wall of the camera, so as to allow the view changing plate to be rotatable in a plane between the base surface and the front wall of the camera.

3. A print format selection device as claimed in claim 1, further comprising a toggle spring suspended between the view changing plate and a base surface on which the view changing member is rotatably mounted, the toggle spring urging the view changing plate to rotate from an intermediate position toward either of two terminal positions.

4. A print format selection device as claimed in claim 3, wherein one end of the toggle spring is inserted through the view changing plate into a groove, the groove having an engaging portion with which the one end of the toggle spring is brought into engagement when the view changing plate is placed in the intermediate position, so as to stop the view changing plate in the intermediate position.

5. A print format selection device as claimed in claim 3, wherein the intermediate position is the first print format position, and the view changing plate has a cutout which is placed in the original field of view of the viewfinder when the view changing plate is placed in the first print format position, the cutout being sized so as not to limit the original field of view in the first print format position.

6. A print format selection device as claimed in claim 3, wherein the manual operation member is formed integrally with the view changing plate and is exposed to an exterior of the camera through an arced slot formed through a front wall of the camera, the arced slot having a click mechanism with which the manual operation member clicks into engagement to stop the view changing plate in the intermediate position.

7. A print format selection device as claimed in claim 3, wherein the manual operation member is a knob secured to a front portion of the view changing plate through a slot formed through the front wall of the camera.

8. A print format selection device as claimed in claim 1, further comprising a data recording means for photographically recording print format data on a data recording area of photo film provided per picture frame outside of picture frames, the data recording means having a light source which projects light toward the data recording area of a picture frame positioned behind the exposure aperture in synchronism with a shutter release operation.

9. A print format selection device as claimed in claim 8, wherein the light source of the data recording means comprises at least a light emission diode which is connected to a flash circuit of the camera and is activated by a trigger signal which is generated when a synchronizing switch of the flash circuit is turned on by the shutter release operation.

10. A print format selection device for a camera having a viewfinder whose original field of view corresponds to a photographic field defined by an exposure aperture of the camera, the print format selection device comprising:
 a manual operation member slidable at least between a first print format position for designating a picture frame to be printed in a first size corresponding to the exposure aperture and a second print format position for designating a picture frame to be printed in a second size different from the first size;
 a view changing plate rotatable about an axis in cooperation with the manual operation member and having at least a different view window whose center is disposed on a circumference of a circle centered on the rotational axis of the view changing plate, said circumference passing through an optical axis of the viewfinder, the view window being placed in the original field of view when the manual operation member is set to the second print format position, limiting the original field of view to correspond to the second size, wherein the rotational axis of the view changing plate is disposed below a taking lens, and the view changing plate has an arced cutout along a circle which is coaxial with the rotational axis and extends across an optical path of the taking lens, so that the view changing plate rotates without interfering in the optical path of the taking lens; and
 a data recording means for photographically recording print format data on a data recording area of photo film provided per picture frame outside of picture frames, the data recording means having a light source which projects light toward the data recording area of a picture frame positioned behind the exposure aperture in synchronism with a shutter release operation.

11. A print format selection device as claimed in claim 10, wherein the camera has a built-in flash device, and the data recording means uses a flash discharge tube of the flash device as the light source, wherein the flash device is automatically charged after each shutter release operation once a charge switch of the flash device is turned on.

12. A print format selection device as claimed in claim 11, further comprising a slidable barrier plate which may be positioned in front of the taking lens or away from the taking lens, the barrier plate being moved by the manual operation member and interconnecting the manual operation member to the view changing plate.

13. A print format selection device as claimed in claim 12, wherein the data recording means further comprises:
 at least a light guide for transmitting light from the light source toward the data recording area of the picture frame positioned behind the exposure aperture;
 a plural number of openings disposed between the light source and the data recording area, to permit recording at most said plural number of dots as print format data on the data recording area; and
 a data switching blade interconnected with the barrier plate so as to be movable in a plane between the light source and the openings such that the data switching blade blocks or passes the light of the light source from or to the openings so as to change the number of dots in accordance with the position of the manual operation member.

14. A print format selection device as claimed in claim 13, wherein the charge switch of the flash device is turned on by movement of the barrier plate away from the taking lens.

15. A print format selection device as claimed in claim 13, wherein the barrier plate comprises a portion closing the front of the viewfinder when the barrier plate is positioned in front of the taking lens.

16. A print format selection device as claimed in claim 13, further comprising a means for blocking the shutter release operation while the taking lens is covered by the barrier plate.

17. A print format selection device as claimed in claim 13, wherein the barrier plate is biased by a spring force in a direction to cover the taking lens such that the manual operation member is moved to one of the first and second print format positions against the spring force and that the barrier plate returns to the closing position when the manual operation member is released.

18. A print format selection device for a camera comprising:
 a manual operation member slidable at least between a first print format position for designating a picture frame to be printed in a first size, a second print format position for designating a picture frame to be printed in a second size different from the first size, and a third print format position for designating a picture frame to be printed in a third size different from the first and second sizes;
 a view changing plate rotatable about an axis and having at least two different view windows whose centers are disposed on a circumference of a circle centered on the rotational axis of the view changing plate, said circumference passing through an optical axis of a viewfinder whose original field of view corresponds to the first size, the view changing plate being rotated along with the manual operation member such that one of the view windows is placed in the original field of view when the manual operation member is set to the second print format position, limiting the original field of view to correspond to the second size, and the other is placed in the original field of view when the manual operation member is set to the third print format position, limiting the original field of view to correspond to the third size;

a data recording means for photographically recording a number of dots as print format data on a data recording area of photo film provided per picture frame outside of picture frames, the data recording means having a light source which projects light toward the data recording area of a picture frame positioned behind the exposure aperture in synchronism with a shutter release operation, and a data switching blade movable linearly in a plane between the light source and the openings such that the data switching blade blocks or passes the light of the light source from or to the openings so as to change the number of dots in accordance with the print format position selected by the manual operation member;

a cam mechanism interconnecting the view changing plate with the data switching plate, said cam mechanism being separate from the view changing plate and the data switching plate;

a first slot disposed within the view changing plate; and a second slot disposed within the data switching blade;

wherein the cam mechanism comprises a first arm and a second arm, each of said arms extending away from a pivot axis, the first arm engaging the first slot and the second arm engaging the second slot, so that rotation of the view changing plate causes rotation of the cam mechanism about the pivot axis, said rotation of the cam mechanism causing linear motion of the data switching blade.

19. A print format selection device as claimed in claim 18, wherein the light source of the data recording means comprises at least a light emission diode which is connected to a flash circuit of the camera and is activated by a trigger signal as being generated when a synchronizing switch of the flash circuit is turned on by the shutter release operation.

* * * * *